(12) United States Patent
Inai

(10) Patent No.: US 9,417,719 B2
(45) Date of Patent: Aug. 16, 2016

(54) INPUT DETECTION DEVICE, CONTROL METHOD THEREOF AND RECORDING MEDIUM

(75) Inventor: Kento Inai, Zushi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 323 days.

(21) Appl. No.: 13/540,853

(22) Filed: Jul. 3, 2012

(65) Prior Publication Data

US 2013/0027062 A1    Jan. 31, 2013

(30) Foreign Application Priority Data

Jul. 29, 2011  (JP) ................................. 2011-167439

(51) Int. Cl.
*G06F 3/0362* (2013.01)
*G06F 3/044* (2006.01)

(52) U.S. Cl.
CPC .............. *G06F 3/0362* (2013.01); *G06F 3/044* (2013.01)

(58) Field of Classification Search
CPC ...... G06F 3/041; G06F 3/044; G01R 27/2605
See application file for complete search history.

(56) References Cited

U.S. PATENT DOCUMENTS

| | | | |
|---|---|---|---|
| 5,970,261 A | * | 10/1999 | Ishiguro et al. .................. 396/85 |
| 8,471,826 B2 | * | 6/2013 | Chang et al. .................. 345/173 |
| 2008/0143681 A1 | * | 6/2008 | XiaoPing ....................... 345/173 |
| 2009/0277762 A1 | * | 11/2009 | Nakatsuka et al. ......... 200/11 R |

FOREIGN PATENT DOCUMENTS

| | | |
|---|---|---|
| JP | 2001-296966 | 10/2001 |
| JP | 2002-304934 A | 10/2002 |
| JP | 2006-073268 A | 3/2006 |
| JP | 2008-258003 A | 10/2008 |
| JP | 2010-287351 A | 12/2010 |

OTHER PUBLICATIONS

The above foreign patent documents were cited in the Jul. 31, 2015 Japanese Office Action, which is enclosed without an English Translation, that issued in Japanese Patent Application No. 2011167439.

* cited by examiner

*Primary Examiner* — Tung X Nguyen
*Assistant Examiner* — Feba Pothen
(74) *Attorney, Agent, or Firm* — Cowan, Liebowitz & Latman, P.C.

(57) ABSTRACT

When the first electrical conductor overlaps one of the three or more detection electrodes, the one detection electrode and the first electrical conductor are capacitively coupled. When the position of the first electrical conductor has changed in accordance with movement of the operation member, it is determined, based on the capacitance of each of the three or more detection electrodes after the change, that the first electrical conductor has moved in a direction from a first detection electrode judged to have decreased the capacitance to a second detection electrode judged to have increased the capacitance.

27 Claims, 16 Drawing Sheets

F I G. 6A
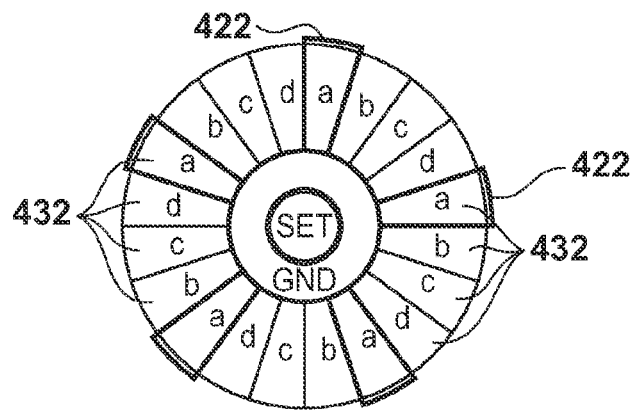
F I G. 6B
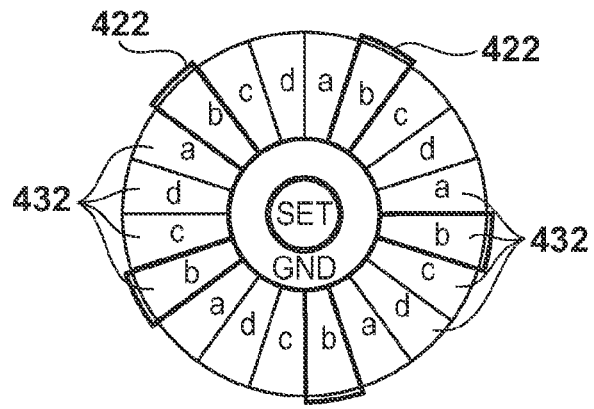
F I G. 6C
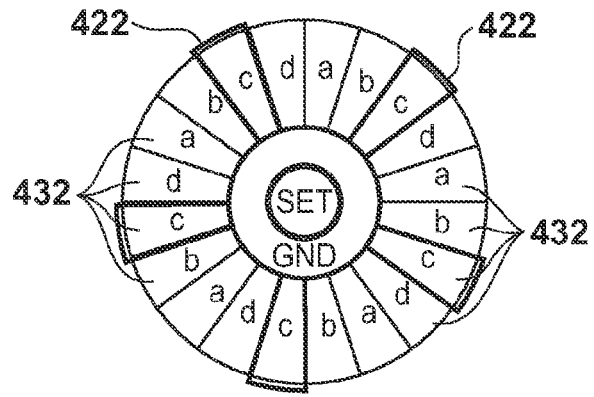
F I G. 6D
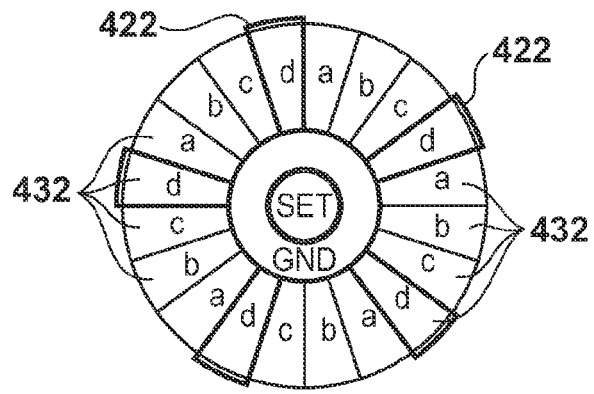

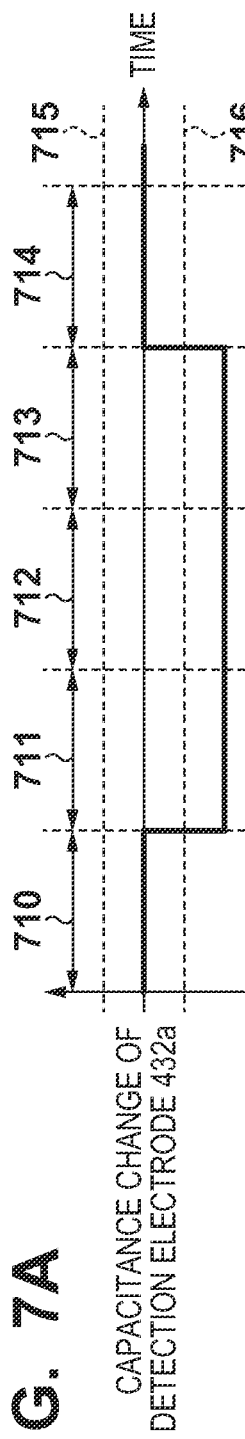
FIG. 7A CAPACITANCE CHANGE OF DETECTION ELECTRODE 432a
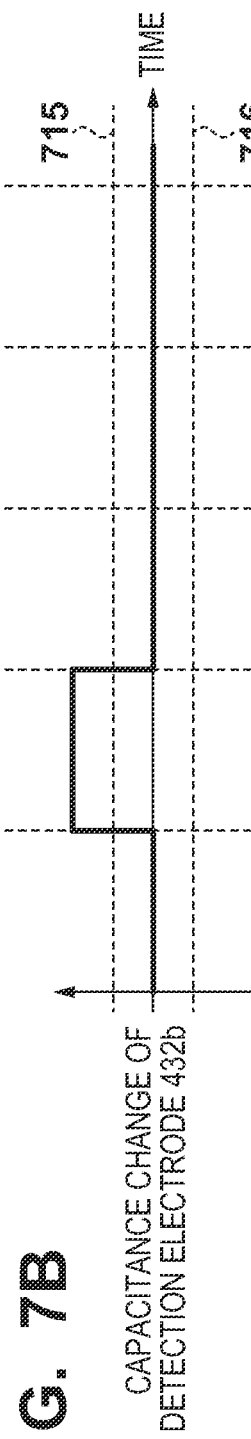
FIG. 7B CAPACITANCE CHANGE OF DETECTION ELECTRODE 432b
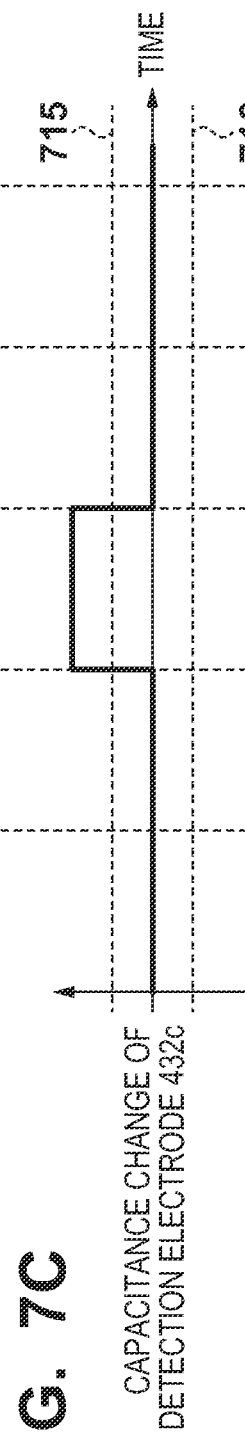
FIG. 7C CAPACITANCE CHANGE OF DETECTION ELECTRODE 432c
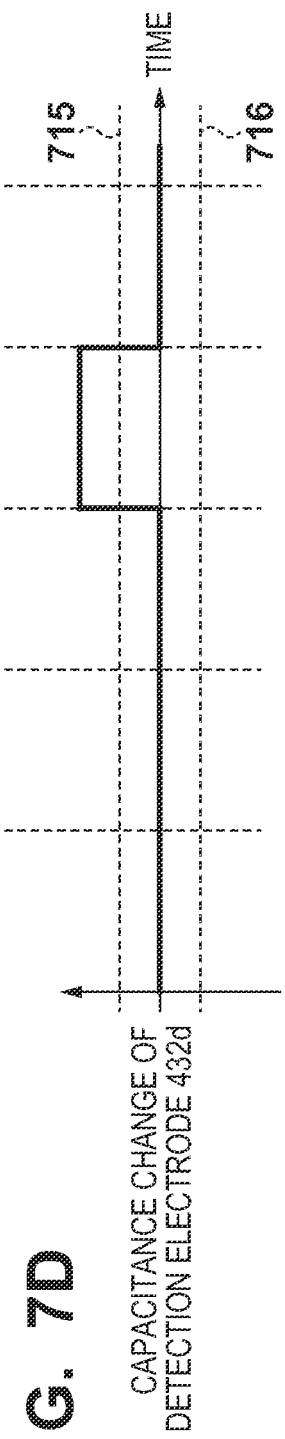
FIG. 7D CAPACITANCE CHANGE OF DETECTION ELECTRODE 432d

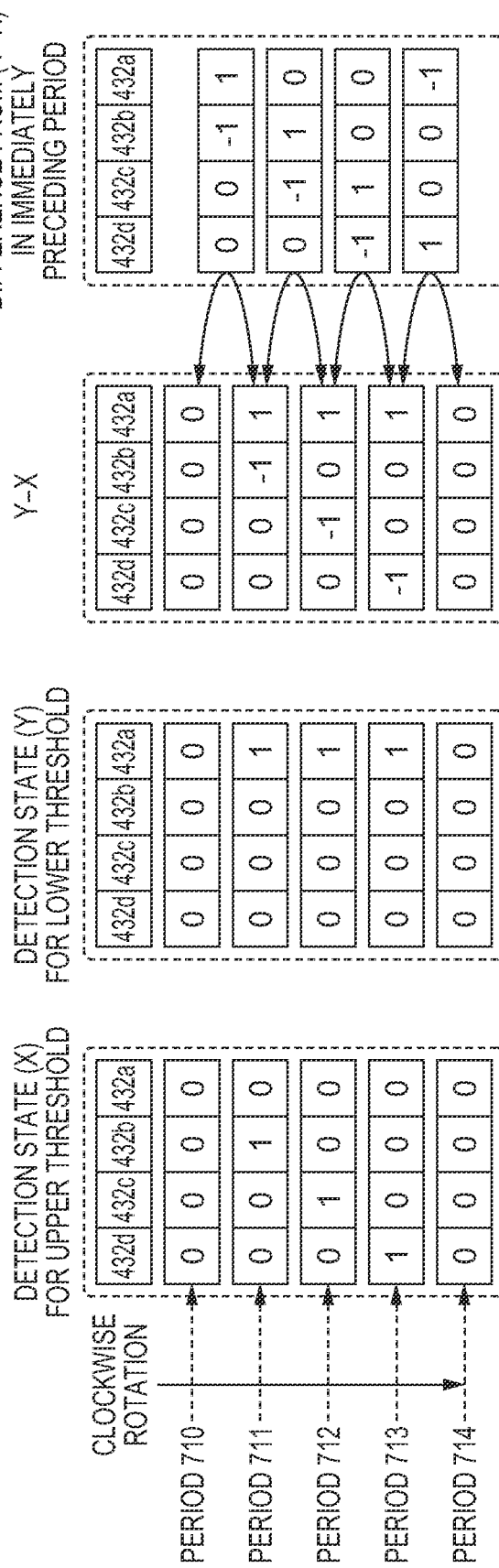

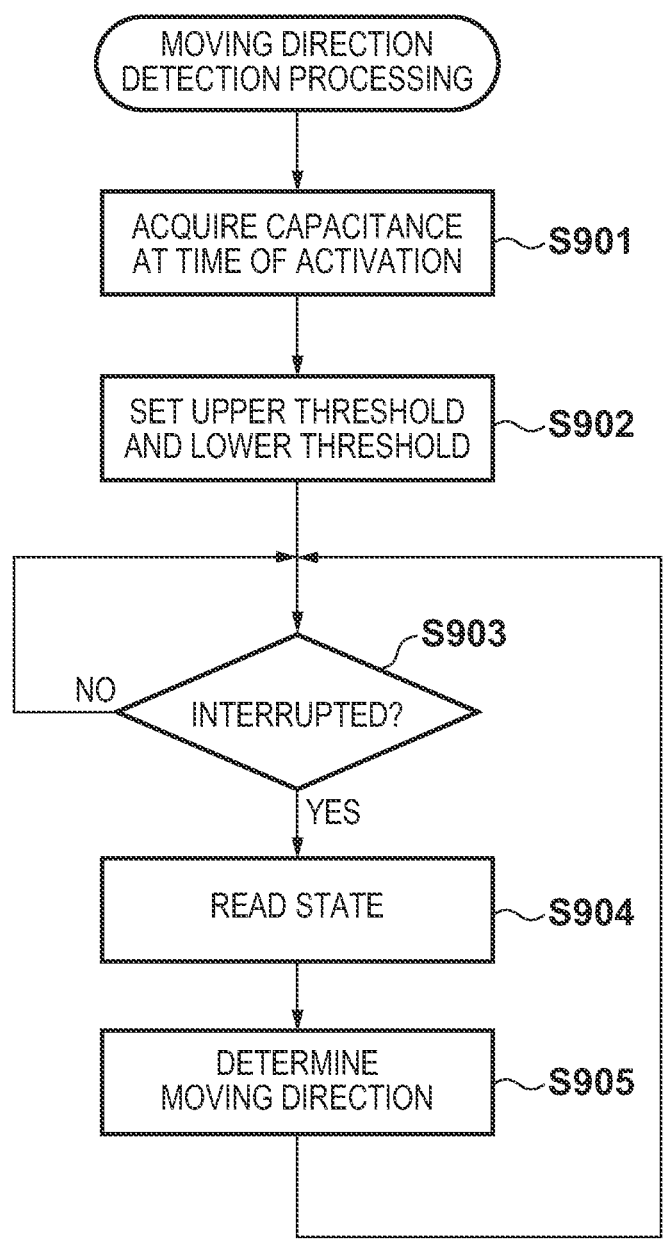

CAPACITANCE CHANGE OF
DETECTION ELECTRODE 432a

CAPACITANCE CHANGE OF
DETECTION ELECTRODE 432b

CAPACITANCE CHANGE OF
DETECTION ELECTRODE 432c

CAPACITANCE CHANGE OF
DETECTION ELECTRODE 432d

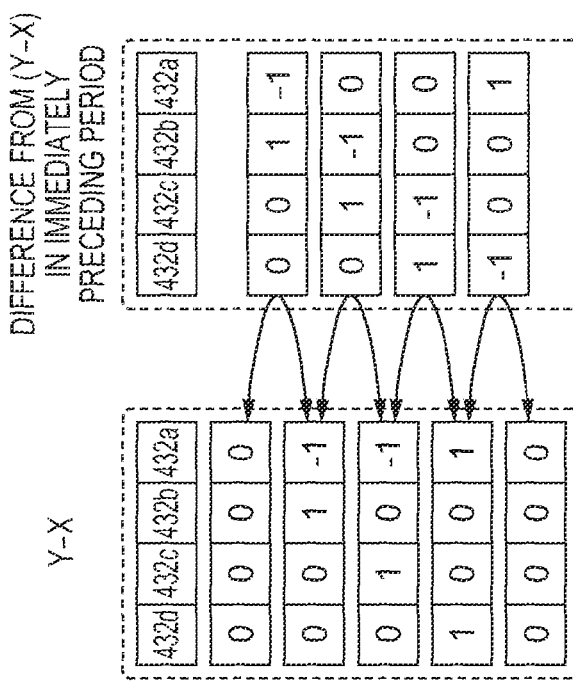
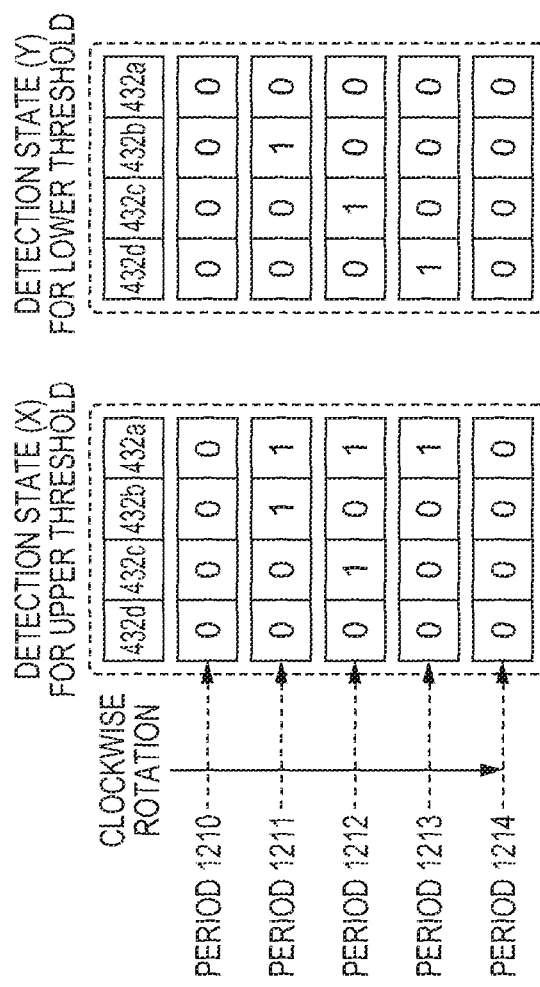

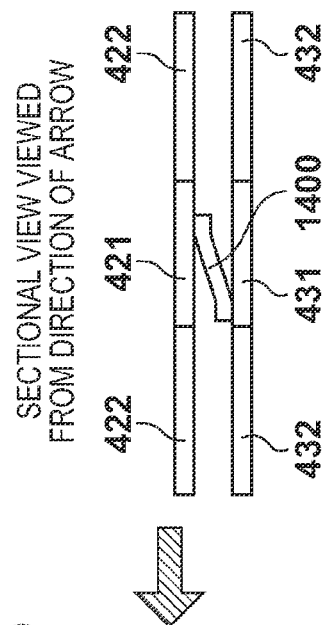
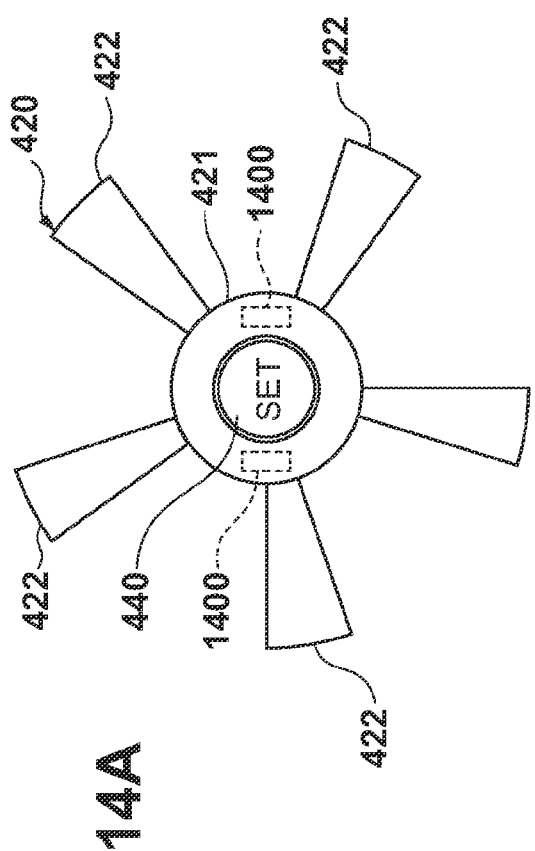
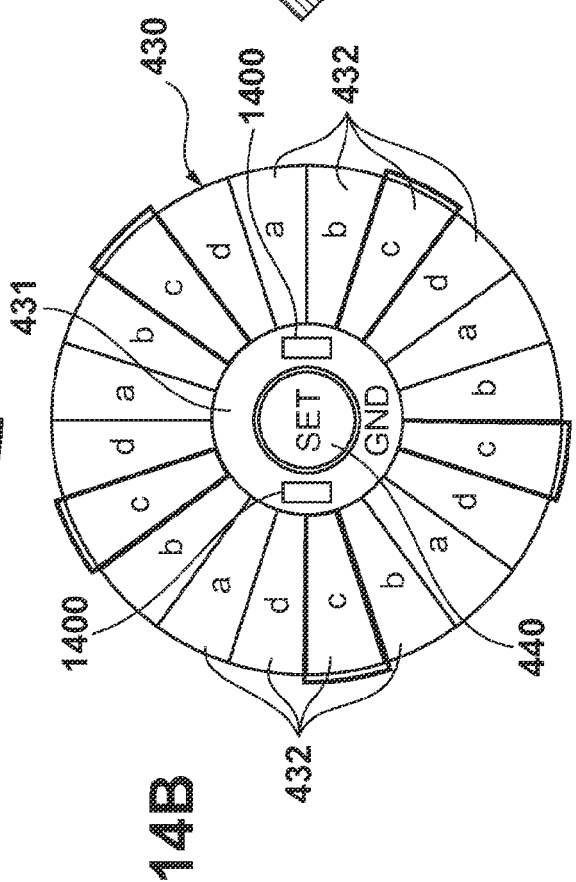

INPUT DETECTION DEVICE, CONTROL METHOD THEREOF AND RECORDING MEDIUM

BACKGROUND OF THE INVENTION

1. Field of the Invention

The present invention relates to a capacitance type input detection device, a control method thereof, and a recording medium, particularly to a technique of detecting the moving direction of an operation member in a capacitance type sensor.

2. Description of the Related Art

In recent years, an electronic apparatus equipped with a display device, such as a cellular phone, a car navigation system, or a digital camera, uses a touch panel display which is operable as the user directly touches the display area by a finger. Various types, such as a capacitance type, a resistive type, and an optical type have been proposed to detect user input on such a touch panel. An appropriate detection type is selected in accordance with the application purpose of an electronic apparatus. In particular, the capacitance type is widely used because of its advantages in detection accuracy and multipoint detection.

The capacitance type touch panel display uses a method of detecting the capacitance component of a human to the earth, that is, detecting a capacitance change that occurs when an electrical conductor having the ground potential (GND) moves close to a sensor, as shown in, for example, FIG. 3A. The capacitance type sensing technique is applied not only to the touch panel display.

Assume a case in which a sensor electrode 301 serving as a sensor pattern and an electrical conductor 302 having the ground potential are provided, as shown in FIG. 3B. When an electrical conductor 303 moves close to the sensor electrode 301 and the electrical conductor 302 so as to overlap them, capacitive coupling occurs between the sensor electrode 301 and the electrical conductor 303 and between the electrical conductor 302 and the electrical conductor 303 so as to form a closed circuit, schematically shown in FIG. 3C. That is, when the electrical conductor 303 moves close to the sensor electrode 301 and the electrical conductor 302, the capacitance detected by a capacitance sensor IC 304 becomes larger than before capacitive coupling. Using this principle makes it possible to detect the presence of the electrical conductor 303 on the sensor electrode 301 with a larger capacitance when, for example, a plurality of sensor electrodes 301 are provided in an array within the movable range of the electrical conductor 303, and their capacitances can independently be detected.

Japanese Patent Laid-Open No. 2001-296966 discloses a method of detecting a rotation angle or a rotation direction in an input device for detecting a rotation input by detecting a capacitance change caused in electrodes arranged in the rotation direction by an electrical conductor that moves in accordance with rotation.

In the method of detecting the current position of an electrical conductor by detecting a capacitance change, as in Japanese Patent Laid-Open No. 2001-296966 described above, however, it is impossible to detect the initial position of the electrical conductor at the start of detection, for example, at the time of activation of an electronic apparatus having a capacitance type sensor. More specifically, in the conventional type, only when the capacitance has increased in the sensor electrode after a state change, the presence of the electrical conductor on the sensor electrode is detected. However, the initial position without a state change cannot be detected.

To enable initial position detection, a method of storing the capacitance of each sensor electrode with an electrical conductor existing above can be considered. However, this method is not realistic because the capacitance changes depending on a condition such as ambient temperature, or individual differences in electrical conductors or sensor electrodes.

If initial position detection is impossible, the moving direction of an electrical conductor from its initial position cannot be detected. That is, when the increase in the capacitance caused by movement is detected, the position where the moved electrical conductor exists can be grasped. However, since the initial position is unknown, the position from which the electrical conductor has moved to the position after movement cannot be grasped.

For this reason, in an electronic apparatus that detects the position of an electrical conductor moving in accordance with an operation member using a capacitance type sensor, conventionally, the first movement—that is, the movement of the electrical conductor from the initial position—needs to be ignored. That is, since the operation that has been done first after activation for the operation member is not reflected, the user may have the impression that the response of the operation system is slow.

The present invention has been made in consideration of the above-described problems, and has as its object to provide a capacitance type input detection device capable of grasping the moving direction of a detection target electrical conductor before and after movement, even if the position before the movement is unknown; a control method thereof; and a recording medium.

SUMMARY OF THE INVENTION

The present invention has been made in consideration of the problems of the related art. The present invention provides a capacitance type input detection device capable of grasping the moving direction of a detection target electrical conductor before and after movement, even if the position before the movement is unknown; a control method thereof; and a recording medium.

According to one aspect of the present invention, there is provided an input detection device comprising: a first electrical conductor configured to change a position in one of movable directions in accordance with movement of an operation member; at least three detection electrodes capable of independently detecting a capacitance and sequentially provided in the movable direction of the first electrical conductor, the detection electrodes being provided with a spacing to the first electrical conductor so that at least one of the at least three detection electrodes faces the first electrical conductor, and at least one of the at least three detection electrodes does not face the first electrical conductor; a detection unit configured to detect the capacitance for each of the at least three detection electrodes; and a determination unit configured to, when the position of the first electrical conductor has changed in accordance with the movement of the operation member, determine, based on the capacitance of each of the at least three detection electrodes detected by the detection unit after the change, that the first electrical conductor has moved in a direction from a first detection electrode judged to have decreased the capacitance to a second detection electrode judged to have increased the capacitance.

According to another aspect of the present invention, there is provided an input detection device comprising: a first electrical conductor configured to change a position in one of movable directions in accordance with movement of an operation member; at least three detection electrodes capable of independently detecting a capacitance and sequentially provided in the movable direction of the first electrical conductor, the detection electrodes being provided with a spacing to the first electrical conductor so that at least one of the at least three detection electrodes faces the first electrical conductor, and at least one of the at least three detection electrodes does not face the first electrical conductor; a detection unit configured to detect the capacitance for each of the at least three detection electrodes; and a determination unit configured to, when the position of the first electrical conductor has changed in accordance with the movement of the operation member, determine, based on the capacitance of each of the at least three detection electrodes detected by the detection unit after the change, that the first electrical conductor has moved in a direction from a first detection electrode judged to have increased the capacitance to a second detection electrode judged to have decreased the capacitance.

According to still another aspect of the present invention, there is provided a control method of an input detection device including: a first electrical conductor configured to change a position in one of movable directions in accordance with movement of an operation member; at least three detection electrodes capable of independently detecting a capacitance and sequentially provided in the movable direction of the first electrical conductor, the detection electrodes being provided with a spacing to the first electrical conductor so that at least one of the at least three detection electrodes faces the first electrical conductor, and at least one of the at least three detection electrodes does not face the first electrical conductor; and a detection unit configured to detect the capacitance for each of the at least three detection electrodes, the method comprising when the position of the first electrical conductor has changed in accordance with the movement of the operation member, determining, based on the capacitance of each of the at least three detection electrodes detected by the detection unit after the change, that the first electrical conductor has moved in a direction from a first detection electrode judged to have decreased the capacitance to a second detection electrode judged to have increased the capacitance.

According to still another aspect of the present invention, there is provided a control method of an input detection device including: a first electrical conductor configured to change a position in one of movable directions in accordance with movement of an operation member; at least three detection electrodes capable of independently detecting a capacitance and sequentially provided in the movable direction of the first electrical conductor, the detection electrodes being provided with a spacing to the first electrical conductor so that at least one of the at least three detection electrodes faces the first electrical conductor, and at least one of the at least three detection electrodes does not face the first electrical conductor; and a detection unit configured to detect the capacitance for each of the at least three detection electrodes, the method comprising when the position of the first electrical conductor has changed in accordance with the movement of the operation member, determining, based on the capacitance of each of the at least three detection electrodes detected by the detection unit after the change, that the first electrical conductor has moved in a direction from a first detection electrode judged to have increased the capacitance to a second detection electrode judged to have decreased the capacitance.

Further features of the present invention will become apparent from the following description of exemplary embodiments (with reference to the attached drawings).

BRIEF DESCRIPTION OF THE DRAWINGS

FIGS. 6A, 6B, 6C, and 6D are state transition diagrams showing the relationship between an electrical conductor 420 and a substrate 430, which changes in accordance with the rotation operation of the operation member according to the first embodiment of the present invention;

FIGS. 7A, 7B, 7C, and 7D are timing charts showing the change amounts of the capacitances of detection electrodes 432 from the time of activation, which change in accordance with the rotation operation of the operation member according to the first embodiment of the present invention;

FIGS. 8A, 8B, 8C, 8D, and 8E are views for explaining the detection principle of the rotation operation direction according to the first embodiment of the present invention;

FIG. 9 is a flowchart of moving direction detection processing according to the first embodiment of the present invention;

FIGS. 13A, 13B, 13C, 13D, and 13E are views for explaining the detection principle of the rotation operation direction according to the modification of the present invention;

FIGS. 14A, 14B, and 14C are views showing the arrangement of a rotation operation unit 201 according to the second embodiment of the present invention.

DESCRIPTION OF THE EMBODIMENTS

First Embodiment

An exemplary embodiment of the present invention will now be described in detail with reference to the accompanying drawings. In the embodiment to be explained below, an example will be described in which the present invention is applied to a sensor unit capable of detecting, using a capacitance type, movement of an operation member provided in a digital camera that is an example of an input detection device.

However, the present invention is applicable to an arbitrary device capable of detecting movement of an object using a capacitance type.

<Functional Arrangement of Digital Camera 100>

Figure 1:
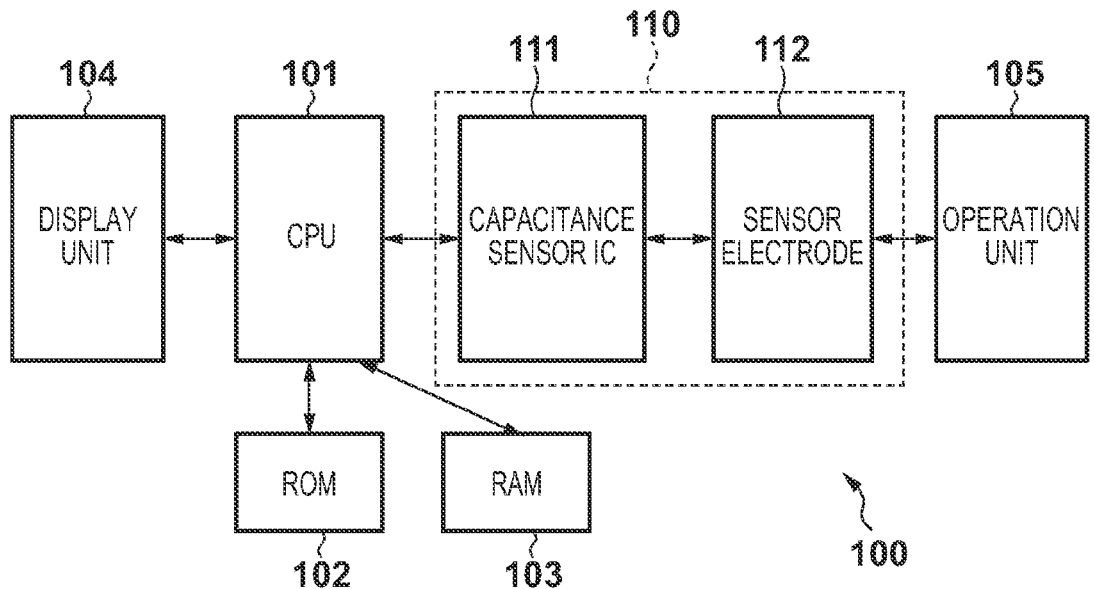
FIG. 1 is a block diagram showing the functional arrangement of a digital camera according to an embodiment of the present invention.

FIG. 1 is a block diagram showing the functional arrangement of a digital camera 100 according to an embodiment of the present invention.

A CPU 101 controls the operation of each block included in the digital camera 100. More specifically, the CPU 101 reads out a moving direction detection processing program to be described later from, for example, a ROM 102, and expands and executes the program on a RAM 103, thereby controlling the operation of each block of the digital camera 100.

The ROM 102 is, for example, a rewritable nonvolatile memory, and stores setting parameters and the like necessary for the operation of each block in addition to the moving direction detection processing program (to be described later). In this embodiment, the ROM 102 stores a width from a reference value as information to set two types of predetermined thresholds (first threshold and second threshold) to be used in moving direction detection processing to judge an increase and decrease in the capacitance caused by movement.

The RAM 103 is, for example, a volatile memory, and serves not only as an area to expand the moving direction detection processing program but also as a storage area to temporarily store intermediate data and the like output in the operation of each block.

A display unit 104 is a display device such as a compact LCD included in the digital camera 100, and displays an image signal output from an image capturing unit (not shown) or image data recorded in a recording medium (not shown). In the present invention, a sensor unit 110, to be described later, detects the moving direction of an operation member. Hence, a detailed description of processing concerning image capture and processing concerning image display will be omitted.

Figure 2:
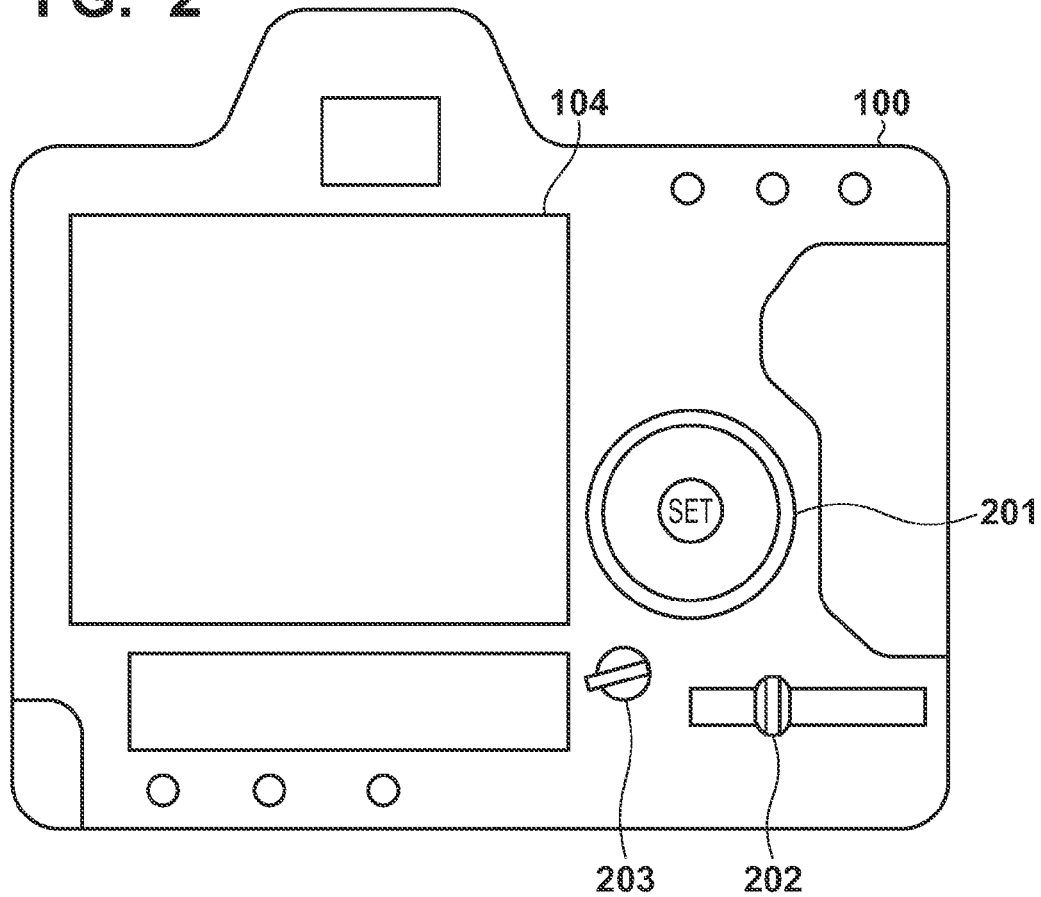
FIG. 2 is a view showing the outer appearance of the digital camera including an operation member according to the embodiment of the present invention.
Figure 3A:
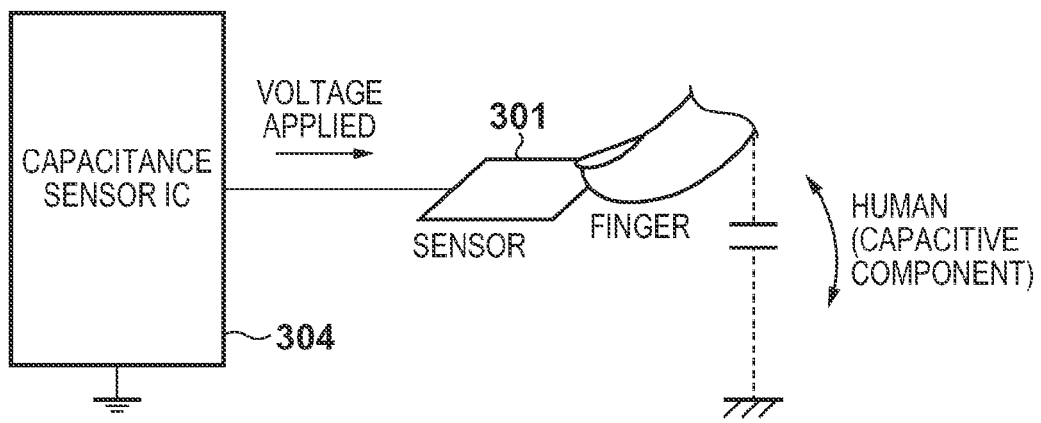
FIGS. 3A, 3B, and 3C are views for explaining a capacitance type sensing method.
Figure 3B:
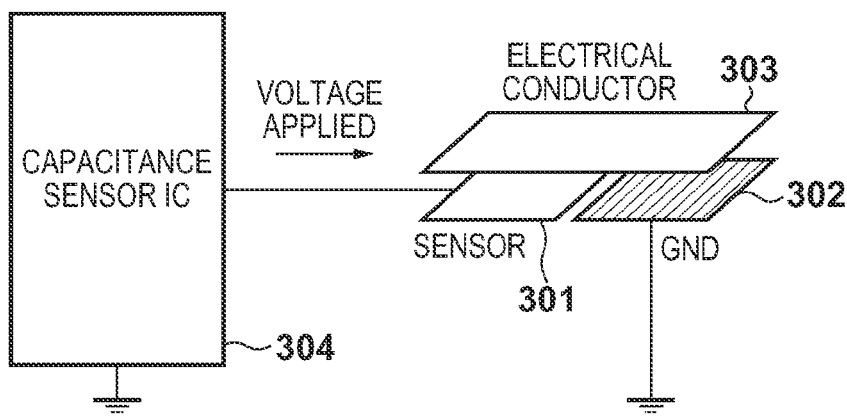
Figure 3C:
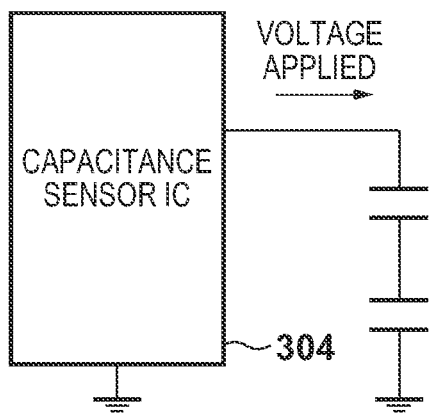

An operation input unit 105 is an operation member included in the digital camera 100, such as a rotation operation unit 201, a slider 202, or a power switch 203 as shown in FIG. 2. In this embodiment, the capacitance type sensor unit 110 detects rotation (movement) that occurs when the user operates the rotation operation unit 201 serving as, for example, a rotary encoder out of the illustrated operation members.

The sensor unit 110 includes a capacitance sensor IC 111 capable of detecting the capacitance of each of three or more sensor electrodes 112 serving as detection electrodes and arranged in the rotation operation unit 201. The capacitance sensor IC 111 can arbitrarily detect a capacitance change to the ground. The capacitance sensor IC 111 applies a voltage to each sensor electrode 112 and periodically monitors the capacitance of each sensor electrode 112.

In this embodiment, the capacitance sensor IC 111 detects the capacitance of each sensor electrode 112 at the time of activation of the digital camera 100, and stores the capacitance in a sensor RAM (not shown) as the reference value of each sensor electrode. The capacitance sensor IC 111 also receives, from the CPU 101, a notification of threshold information stored in the ROM 102, and sets a lower threshold (first threshold) and an upper threshold (second threshold) with respect to the reference value of each sensor electrode based on the threshold information. In the periodical monitoring, if the capacitance of one of the sensor electrodes 112 has changed across one of the lower threshold and the upper threshold, the capacitance sensor IC 111 notifies the CPU 101 of an interrupt. As described above, the sensor unit 110 of this embodiment can detect the presence/absence of movement of the operation member and notify the CPU 101 of it by monitoring the capacitance change from the reference value for each detection electrode. Upon receiving the notification, the CPU 101 requests the sensor unit 110 to output the information of the capacitance state of each detection electrode and determine the moving direction of the operation member using the information, as will be described later.

Note that in this embodiment, the description will be made below assuming that the information of the first threshold and the second threshold is read out from the ROM 102 by the CPU 101 and transmitted to the capacitance sensor IC 111 after activation of the digital camera 100. However, the threshold information may be stored in, for example, an internal nonvolatile memory (not shown) of the sensor unit 110 in advance.

Also, in this embodiment, the description will be made assuming that the CPU 101 determines the rotation direction of the rotation operation unit 201 based on the information of the capacitance change of each detection electrode output from the sensor unit 110. However, moving direction determination is not limited to this. For example, the capacitance sensor IC 111 may determine the moving direction and output it simultaneously with movement detection. Alternatively, the CPU 101 may determine the moving direction by monitoring the capacitance of each detection electrode, like the capacitance sensor IC 111.

(Arrangement of Rotation Operation Unit 201)

The arrangement of the rotation operation unit 201 will be described below in detail with reference to the drawings.

Figure 4A:
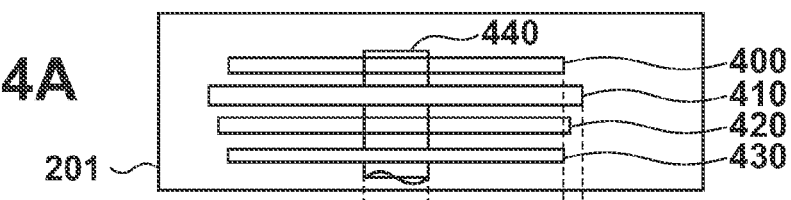
FIGS. 4A, 4B, 4C, 4D, and 4E are views showing the arrangement of a rotation operation unit 201 according to the first embodiment of the present invention.

As shown in the sectional view of FIG. 4A, the rotation operation unit 201 has a SET button 440 at the center, and includes a movable portion 400, a guide ring 410, an electrical conductor 420, and a substrate 430 which have a rotating shaft corresponding to the central axis of the SET button 440.

Figure 4B:
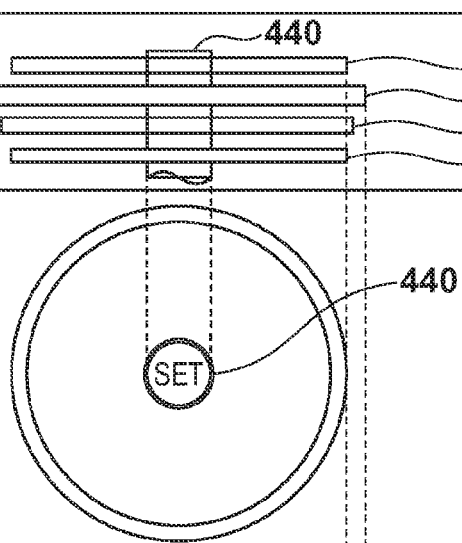

The movable portion 400 is a rotatable member that can move in the circumferential direction and is moved by a user's rotation operation, as shown in FIG. 4B. The electrical conductor 420 to be described later is configured to rotate together with the movable portion 400.

Figure 4C:
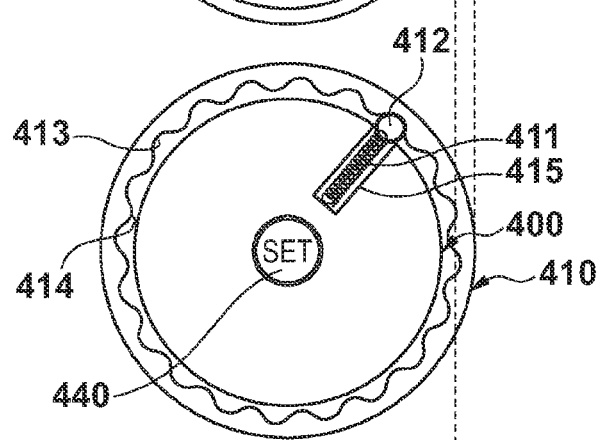

The guide ring 410 is a fixed member provided to rotationally move the movable portion 400 in a predetermined moving unit, as shown in FIG. 4C. The same plane as the guide ring 410 has a spring 411 provided in the radial direction of the rotating shaft of the SET button 440, and a ball 412 provided at one end of the spring 411. The other end of the spring 411 is fixed to the movable portion 400. Concave portions 413 and convex portions 414 are continuously provided periodically on the inner surface side of the guide ring 410. The ball 412 is biased in the radial direction by the spring 411 so as to engage with the concave portion 413. Note that the spring 411 is supported by a guide 415 so as not to bend and change the biasing direction when the movable portion 400 rotationally moves.

In this arrangement, when the movable portion 400 rotates to move the ball 412 from the concave portion 413 to the adjacent concave portion 413 over the convex portion 414, a resistance force is generated in the movable portion 400 so that the ball 412 engages with one of the concave portions 413 by the elastic force of the spring 411. That is, the rotational movement unit (rotation unit) of the movable portion 400 is the angle defined by the interval of the concave portions 413. The impact generated when the spring 411 engages with the concave portion 413 by the resistance force is perceived by the user via the movable portion 400. This allows the user to experience a suitable feeling of operation (a "click feeling").

Figure 4D:
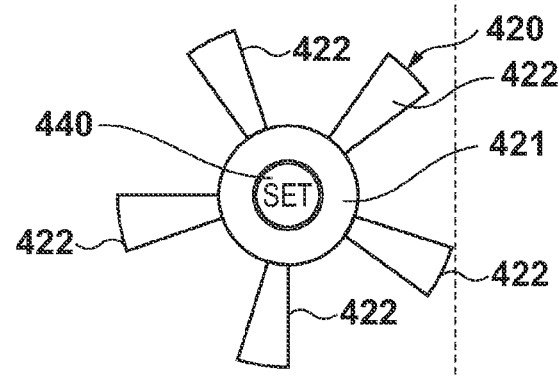

The electrical conductor 420 (first electrical conductor) is a member that moves in accordance with the movement of the movable portion 400, causes capacitive coupling when it overlaps each detection electrode of the sensor electrode 112, and changes the capacitance of the detection electrode, as shown in FIG. 4D. The electrical conductor 420 includes a GND facing portion 421 provided around the SET button 440, and a plurality of blade-shaped detection electrode facing portions 422 radially extending from the GND facing portion 421. The GND facing portion 421 and the detection electrode facing portions 422 are capacitively coupled with a GND pattern 431 and detection electrodes 432 of the substrate 430 to be described later, respectively.

Figure 4E:
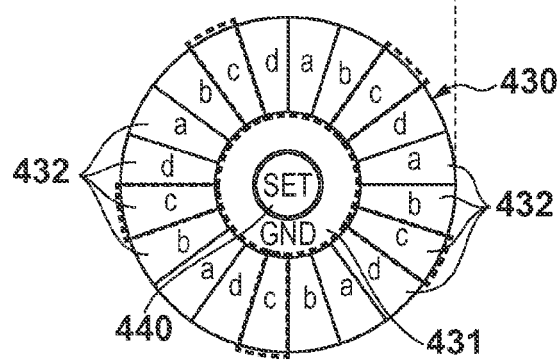

The substrate 430 is a circuit substrate on which the plurality of detection electrodes 432 serving as the sensor electrodes 112 and the GND pattern 431 that is an electrical conductor having the ground potential are arranged, as shown in FIG. 4E. The electrical conductor 420 and the substrate 430 are arranged such that the GND facing portion 421 and the detection electrode facing portions 422 face the GND pattern 431 and the detection electrodes 432, respectively, at a predetermined spacing.

The capacitance sensor IC 111 applies a voltage to the detection electrodes 432 and periodically detects their capacitances, as described above. The circumferential size of one detection electrode 432 is defined by the rotation resolution corresponding to the rotational movement unit of the movable portion 400. That is, the sensor unit 110 needs to detect the capacitance change in each detection electrode 432 when the movable portion 400 rotates by the movement unit. For this reason, the size of the detection electrode 432 is defined by the rotation angle corresponding to the movement unit of the movable portion 400. Similarly, the circumferential size of one detection electrode facing portion 422 of the electrical conductor 420 facing the detection electrode 432 is also defined by the rotation angle corresponding to the movement unit of the movable portion 400.

When the ball 412 engages with one concave portion 413, the overlap area between one detection electrode facing portion 422 and one detection electrode 432 is maximized. That is, placing focus on one detection electrode 432, when the ball 412 engages with the concave portion 413, the detection electrode 432 takes one of a state in which it does not face one detection electrode facing portion 422 at all, and a state in which almost the entire surface of the detection electrode 432 faces one detection electrode facing portion 422 during movement of the movable portion 400.

Note that the capacitance is proportional to the overlap area between the electrical conductors (GND facing portion 421, GND pattern 431, detection electrode facing portions 422, and detection electrodes 432) facing each other. For this reason, the capacitance change amount may be small depending on the rotation resolution, and it may be impossible to detect the movement of the operation member. To prevent this, the plurality of detection electrodes 432 are divided into groups, each including a predetermined number of detection electrodes, as shown in FIG. 4E. The detection electrode facing portions 422 are configured to simultaneously overlap the predetermined number of detection electrodes put into the same group, as shown in FIG. 4D. In the example of FIG. 4E, the plurality of detection electrodes 432 are divided into four groups: a, b, c, and d. The detection electrodes 432 of the respective groups are periodically cyclically provided in the order of a, b, c, and d in the circumferential direction. In FIG. 4E, the rotation angle corresponding to the movement unit of the movable portion 400 is 18°. Since the 20 detection electrodes 432 are provided in the circumferential direction, five detection electrodes 432 are put into one group. That is, the electrical conductor 420 is provided with five detection electrode facing portions 422 that simultaneously overlap the detection electrodes 432 put into the same group.

Figure 5:
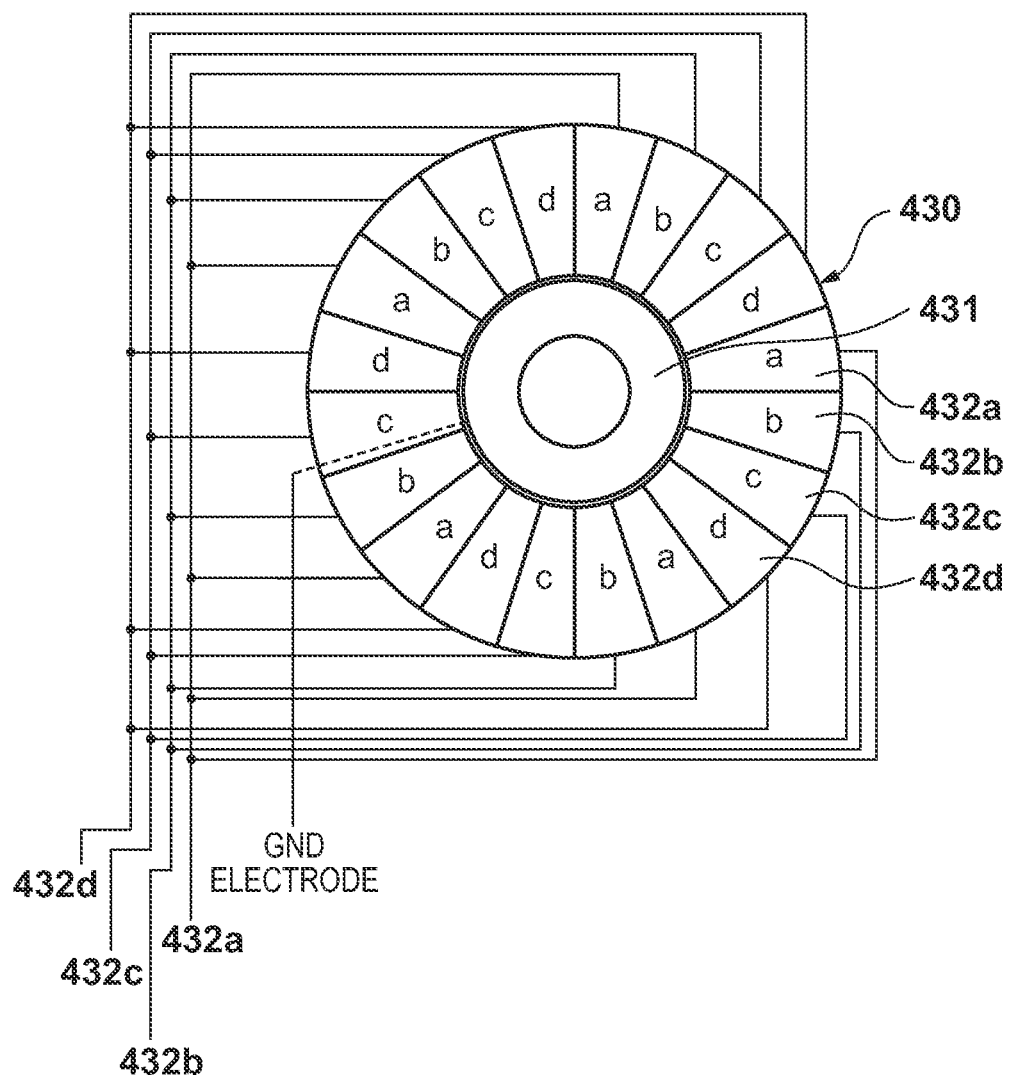
FIG. 5 is another view showing the arrangement of the rotation operation unit 201 according to the first embodiment of the present invention.

In this embodiment, the description will be made assuming that the capacitance sensor IC 111 detects the capacitances of the plurality of detection electrodes 432 that are the sensor electrodes 112 divided into the four groups a, b, c, and d on the group basis, as illustrated. That is, the detection electrodes 432 put into each group are connected as shown in FIG. 5. The capacitance sensor IC 111 detects the sum of the capacitances of the detection electrodes 432 of each group. "One detection electrode" means the detection electrodes of one group hereinafter.

Note that to detect which of the positive direction and the negative direction is the moving direction of the movable portion 400, it is necessary to detect the capacitance change in each of at least three detection electrodes. For this reason, when dividing the detection electrodes 432 into groups, as in this embodiment, the detection electrodes are divided into three or more groups. Note that when, for example, the rotation resolution of the movable portion 400 is small, the detection electrodes 432 need not always be divided into groups, as can easily be understood.

The predetermined spacing between the electrical conductor 420 and the substrate 430 is a distance that allows capacitive coupling between the elements facing each other. In this embodiment, after activation of the digital camera 100, some of the plurality of detection electrodes 432 are always capacitively coupled with the detection electrode facing portions 422 of the electrical conductor 420. The GND facing portion 421 and the GND pattern 431 are configured to always face each other and not to change the facing area; that is, cause a capacitance change.

<Rotation Operation Detection Principle of Rotation Operation Unit 201>

The principle of detecting the direction of the user's rotation operation of the rotation operation unit 201 in the digital camera 100, according to the embodiment having the above-described arrangement, will be described below in detail with reference to the drawings.

FIGS. 6A to 6D are diagrams showing the transition of the relationship between the electrical conductor 420 and the substrate 430 when the user rotates the movable portion 400 of the rotation operation unit 201 clockwise. The capacitance change in each detection electrode (group) when the electrical conductor 420 is arranged in the state shown in FIG. 6A at the time of activation of the digital camera 100, and the state transits in the order of FIG. 6A→FIG. 6B→FIG. 6C→FIG. 6D→FIG. 6A . . . in accordance with the rotation operation will be explained here.

FIGS. 7A to 7D are timing charts showing the change amounts from the capacitances detected at the time of activation of the digital camera 100 for the detection electrodes (groups) 432a, 432b, 432c, and 432d. Periods 710, 711, 712, 713, and 714 correspond to the periods the electrical conductor 420 and the substrate 430 are in the states shown in FIGS. 6A, 6B, 6C, 6D, and 6A, respectively.

In the period 710, the movable portion 400 is not rotating from the state in which the capacitance of each detection electrode has been detected at the time of activation of the digital camera 100. At this time, if an environmental condition such as the temperature does not change, the capacitance detected for each detection electrode is almost the reference value in the period 710.

When the relationship between the electrical conductor 420 and the substrate 430 transits from the state in FIG. 6A to the state in FIG. 6B, the capacitances change to the values in the period 711. More specifically, the detection electrode facing portions 422, which overlapped the detection electrodes 432a, overlap the detection electrodes 432b that had no overlap in the period 710 but do not overlap the detection electrodes 432a at all. Hence, the capacitances of the detection electrodes 432a and 432b change as shown in FIGS. 7A to 7D. The capacitance detected for the detection electrodes 432a, that was large at the time of activation due to capacitive coupling with the detection electrode facing portions 422, decreases across a lower threshold 716 because the capacitive coupling is canceled. The capacitance detected for the detection electrodes 432b, which have no capacitive coupling at the time of activation, increases across an upper threshold 715 because the detection electrodes face the detection electrode facing portions 422 and are capacitively coupled with them in accordance with rotational movement of the movable portion 400.

Similarly, when the relationship between the electrical conductor 420 and the substrate 430 transits from the state in FIG. 6B to the state in FIG. 6C, the capacitances of the detection electrodes 432b and 432c change from the values in the period 711 to the values in the period 712. When the relationship between the electrical conductor 420 and the substrate 430 transits from the state in FIG. 6C to the state in FIG. 6D, the capacitances of the detection electrodes 432c and 432d change from the values in the period 712 to the values in the period 713. When the relationship between the electrical conductor 420 and the substrate 430 transits from the state in FIG. 6D to the state in FIG. 6A, the capacitances of the detection electrodes 432d and 432a change from the values in the period 713 to the values in the period 714, and return to the same capacitances as in the period 710.

That is, the rotation operation performed for the movable portion 400 can be detected based on the change amount from the capacitance detected for each detection electrode at the time of activation of the digital camera 100. More specifically, when the movable portion 400 rotates, the capacitance of at least one of the detection electrodes 432 decreases, and simultaneously, the capacitance of at least one of the detection electrodes 432 increases.

Note that in this embodiment, to discriminate between a capacitance change caused by movement of the electrical conductor 420 and a capacitance change caused by a measurement variation at the time of detection, the upper threshold 715 (second threshold) and the lower threshold 716 (first threshold) are set with respect to the capacitance from the time of activation. Upon detecting both a detection electrode whose capacitance has fallen below the first threshold and a detection electrode whose capacitance has exceeded the second threshold from the time of activation, the capacitance sensor IC 111 notifies the CPU 101 of an interrupt.

According to the example shown in FIGS. 7A to 7D, in the period 711, the capacitance of the detection electrodes 432a has a value equal to or smaller than the lower threshold set with respect to the reference value, whereas the capacitance of the detection electrodes 432b has a value equal to or larger than the upper threshold set with respect to the reference value. Similarly, in the period 712, the capacitance of the detection electrodes 432a has a value equal to or smaller than the lower threshold, whereas the capacitance of the detection electrodes 432c has a value equal to or larger than the upper threshold. In the period 713, the capacitance of the detection electrodes 432a has a value equal to or smaller than the lower threshold, whereas the capacitance of the detection electrodes 432d has a value equal to or larger than the upper threshold.

Note that the first threshold and the second threshold need only be values that allow to detect the rotation of the movable portion 400. They can be either equal or different as the absolute values with respect to the reference value.

Upon receiving the interrupt notification from the capacitance sensor IC 111 that has detected rotation of the movable portion 400, the CPU 101 performs read from the sensor unit 110. The read from the sensor unit 110 can be done to read the value of the change amount of the capacitance or information representing which are the detection electrode having a capacitance equal to or larger than the upper threshold, the detection electrode having a capacitance equal to or smaller than the lower threshold, and the detection electrode having a capacitance smaller than the upper threshold and larger than the lower threshold (or to which group the detection electrode belongs). To determine the rotation direction generated when the user performs the rotation operation of the movable portion 400 of the rotation operation unit 201, only information representing whether a capacitance change has occurred upon movement is necessary. Hence, in this embodiment, a method of determining the rotation direction using information representing which are the detection electrode having a capacitance equal to or larger than the upper threshold, the detection electrode having a capacitance equal to or smaller than the lower threshold, and the detection electrode having a capacitance smaller than the upper threshold and larger than the lower threshold will be described.

When the relationship between the electrical conductor 420 and the substrate 430 transits in the order of FIG. 6A→FIG. 6B→FIG. 6C→FIG. 6D→FIG. 6A, the capacitance sensor IC 111 detects a detection electrode whose capacitance has exceeded the upper threshold and a detection electrode whose capacitance has fallen below the lower threshold in each state, and notifies the CPU 101 of an interrupt. Upon receiving the interrupt notification, the CPU 101 acquires the information of the detection electrodes from the sensor unit 110 in each period, and stores the information in the RAM 103.

At this time, the detection electrodes having a capacitance equal to or larger than the upper threshold and the detection electrodes having a capacitance equal to or smaller than the lower threshold in each period can time-serially be represented by numerical logic values of 1 and 0 (1 when the condition is satisfied) as shown in FIGS. 8A and 8B. When the numerical logic value of the detection state for the upper threshold is subtracted from the numerical logic value of the detection state for the lower threshold, a result as shown in FIG. 8C is obtained. That is, in FIG. 8C, a detection electrode having a capacitance equal to or smaller than the lower threshold is represented by "1", and a detection electrode having a capacitance equal to or larger than the upper threshold is represented by "−1" in each period.

In addition, when the corresponding values in the immediately preceding period are subtracted from the values representing the state in which the capacitance is equal to or smaller than the lower threshold and the state in which the capacitance is equal to or larger than the upper threshold in each period, information representing whether the capacitance has increased/decreased between the states can be obtained, as shown in FIG. 8D. In FIG. 8D, a detection electrode whose capacitance has increased across the upper threshold or the lower threshold between the states due to state transition is represented by "−1", and a detection electrode whose capacitance has decreased across the upper threshold or the lower threshold is represented by "1". That is, the rotation direction of the movable portion 400 in each state can be determined as the direction from the detection electrode represented by "1" to the detection electrode represented by "−1" in FIG. 8D, that is, the direction from the detection electrode whose capacitance has decreased to the detection electrode whose capacitance has increased. For example, the CPU 101 can determine, based on the increase/decrease in the capacitance from the period 710 to the period 711, that the movable portion 400 has moved in the direction from the detection electrode 432a to the detection electrode 432b.

Figure 8E:
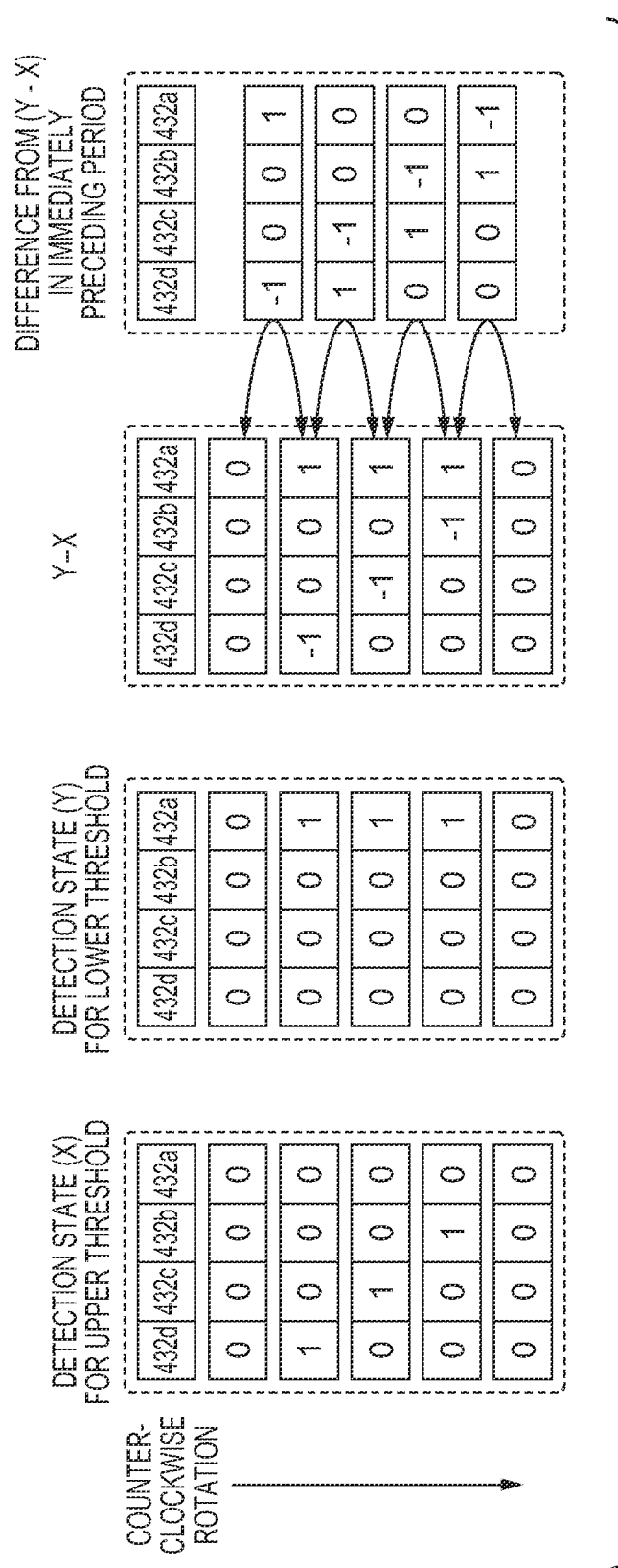

Similarly, when the rotation operation of the movable portion 400 is done in the reverse direction, information representing whether the capacitance of a detection electrode has increased/decreased between the states can be obtained, as shown in FIG. 8E. This allows the CPU 101 to determine the rotation direction.

In this embodiment, the rotation direction detection principle has been described assuming that the capacitance change of each detection electrode is analyzed by the method as shown in FIG. 8E. However, the rotation direction detection principle is not limited to this. In the present invention, at least the direction of initial movement of the operation member needs to be grasped. Hence, the direction of initial movement may be determined using only the change amount of the capacitance of each detection electrode from the time of activation to the end of initial movement. More specifically, it is determined based on the change amount after an initial movement that the operation member has moved in the direction from a first detection electrode, judged to have decreased its capacitance, to a second detection electrode, judged to have increased its capacitance across the second threshold. Especially when detecting movement of the operation member using three or more detection electrodes cyclically provided, as in this embodiment, the moving direction is determined as the direction from the first detection electrode to the second detection electrode across the boundary where the first detection electrode and the second detection electrode are adjacent to each other. For movement after the initial movement, the direction may be judged from the history of detection electrodes for which an increase in the capacitance has been detected, as in the conventional method.

<Moving Direction Detection Processing>

Moving direction detection processing of the digital camera 100 according to this embodiment using the above-described detection principle will be described in detail with reference to the flowchart of FIG. 9. Processing corresponding to this flowchart can be implemented by causing the CPU 101 to read out a corresponding processing program stored in, for example, the ROM 102 and expanding and executing it on the RAM 103. Note that the explanation will be made assuming that the moving direction detection processing starts at the time of, for example, activation of the digital camera 100.

In step S901, the CPU 101 causes the capacitance sensor IC 111 to acquire the information of the initial value of the capacitance at the time of activation of the digital camera 100 for each of the plurality of detection electrodes 432 that are the sensor electrodes 112 provided on the rotation operation unit 201. The CPU 101 stores the initial value information acquired by the capacitance sensor IC 111 in a sensor RAM (not shown) of the sensor unit 110 as a reference value.

In step S902, the CPU 101 reads out, from the ROM 102, the information of the upper threshold and the lower threshold of the capacitance of the detection electrode to be used to judge whether movement has occurred, and transmits the threshold information to the capacitance sensor IC 111 of the sensor unit 110. The capacitance sensor IC 111 sets the lower threshold (first threshold) and the upper threshold (second threshold) with respect to the reference value of each sensor electrode based on the information of the upper threshold and the lower threshold transmitted from the CPU 101. In this embodiment, the description will be made assuming that the threshold information is stored in the ROM 102. However, the threshold information may be stored in a memory (not shown) of the sensor unit 110 readable by the capacitance sensor IC 111.

In step S903, the CPU 101 judges whether it has received, from the capacitance sensor IC 111, an interrupt notification representing that a predetermined capacitance change caused by a user's rotation operation of the movable portion 400 of the rotation operation unit 201 has been detected. More specifically, the capacitance sensor IC 111 periodically acquires the capacitance of each detection electrode 432, and notifies the CPU 101 of an interrupt if there exists a detection electrode whose capacitance has changed across the lower threshold or the upper threshold.

Upon judging that the interrupt notification from the capacitance sensor IC 111 has been received, the CPU 101 advances the process to step S904. Upon judging that no notification has been received, the CPU 101 repeats the process of step S903 to wait for an interrupt.

In step S904, the CPU 101 that has received the interrupt notification from the capacitance sensor IC 111 reads out, from the sensor unit 110, information representing, for each detection electrode 432, whether the capacitance is equal to or larger than the upper threshold or equal to or smaller than the lower threshold.

In step S905, the CPU 101 determines the moving direction of the rotation operation using the above-described detection principle based on the information about each detection electrode 432 acquired in step S904, and reflects the determination result on another processing such as display processing. Then, the process returns to step S903.

As described above, the capacitance type input detection device of this embodiment can discriminate the moving direction of initial movement (moving direction before and after movement) even when the initial position (position before movement) of the detection target electrical conductor is unknown.

[Modification]

Figure 10A:
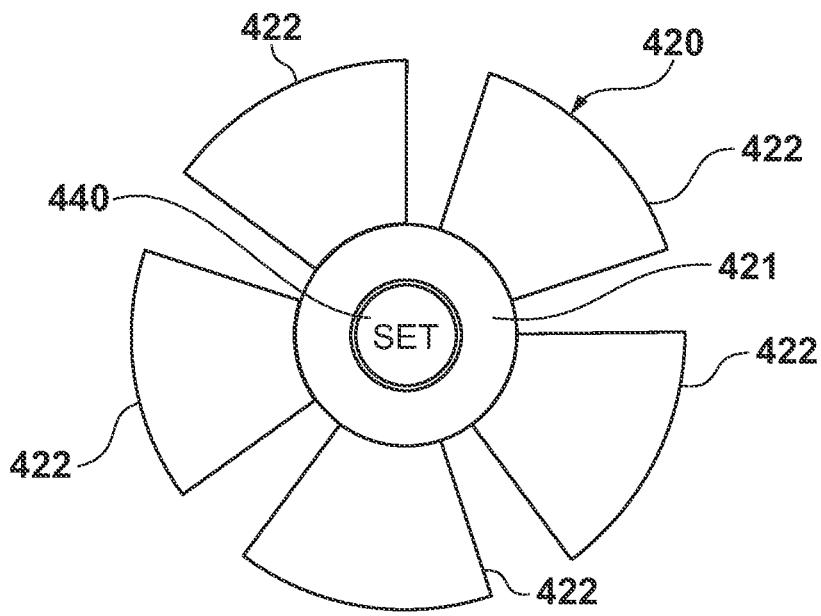
FIGS. 10A and 10B are views showing the arrangement of the rotation operation unit 201 according to a modification of the present invention.
Figure 10B:
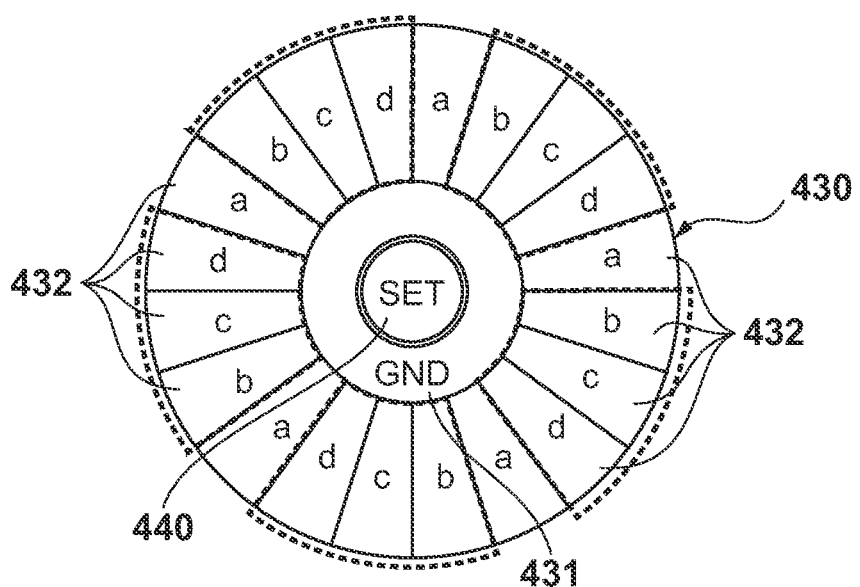

The first embodiment has been described assuming that one detection electrode facing portion 422 of the rotation operation unit 201 overlaps one detection electrode 432, as shown in FIG. 4E. However, the arrangement of capacitance type rotation detection using the detection electrode facing portions 422 is not limited to this. For example, the electrical conductor 420 may have the structure shown in FIG. 10A. In the electrical conductor 420 shown in FIG. 10A, the detection electrode facing portions 422 are configured to face the detection electrodes except one (group) of the plurality of detection electrodes 432 serving as the sensor electrodes 112 when the electrical conductor 420 overlaps the substrate 430, as shown in FIG. 10B. In the rotation operation unit 201 having the electrical conductor 420, the detection electrodes 432 that are not capacitively coupled with the detection electrode facing portions 422 are detected to judge the presence/absence of movement of the movable portion 400, unlike the first embodiment.

FIGS. 11A to 11D are diagrams showing the transition of the relationship between the electrical conductor 420 and the substrate 430 when the user rotates the movable portion 400 of the rotation operation unit 201 clockwise, as in the first embodiment. The capacitance change in each detection electrode (group) when the electrical conductor 420 is arranged in the state shown in FIG. 11A at the time of activation of the digital camera 100, and the state transits in the order of FIG.

11A→FIG. 11B→FIG. 11C→FIG. 11D→FIG. 11A . . . in accordance with the rotation operation will be explained here.

FIGS. 12A to 12D are timing charts showing the change amounts from the capacitances detected at the time of activation of the digital camera 100 for the detection electrodes (groups) 432a, 432b, 432c, and 432d. Periods 1210, 1211, 1212, 1213, and 1214 correspond to the periods the electrical conductor 420 and the substrate 430 are in the states shown in FIGS. 11A, 11B, 11C, 11D, and 11A, respectively.

In the period 1210, the movable portion 400 is not rotating from the state in which the capacitance of each detection electrode has been detected at the time of activation of the digital camera 100. At this time, if an environmental condition such as the temperature does not change, the capacitance detected for each detection electrode is almost the reference value in the period 1210.

Figure 11A:
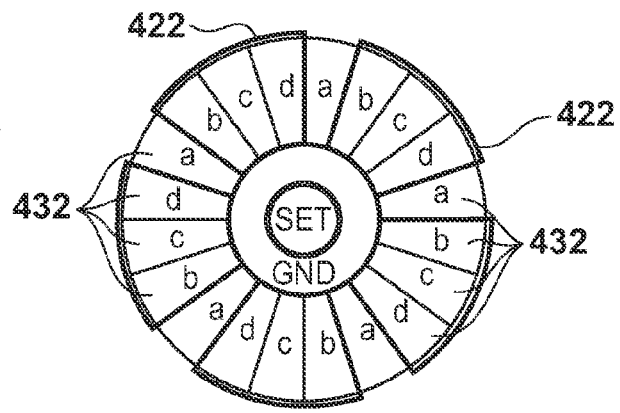
FIGS. 11A, 11B, 11C, and 11D are state transition diagrams showing the relationship between the electrical conductor 420 and the substrate 430, which changes in accordance with the rotation operation of the operation member according to the modification of the present invention.
Figure 11B:
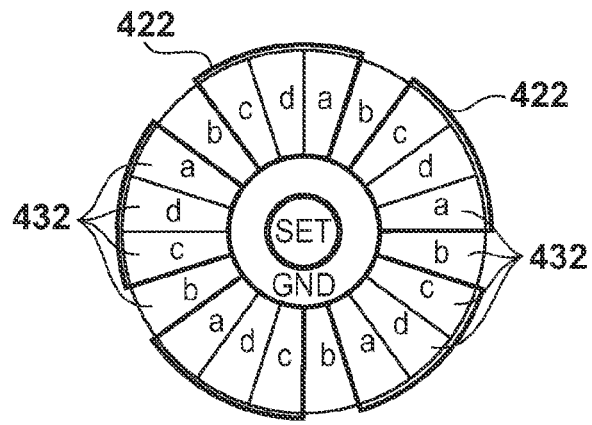

When the relationship between the electrical conductor 420 and the substrate 430 transits from the state in FIG. 11A to the state in FIG. 11B, the capacitances change to the values in the period 1211. More specifically, the detection electrode facing portions 422, which did not overlap the detection electrodes 432a in the period 1210, overlap the detection electrodes 432a in the period 1211. In addition, the detection electrode facing portions 422, which overlapped the detection electrodes 432b in the period 1210, do not overlap the detection electrodes 432b in the period 1211 at all. Hence, the capacitances of the detection electrodes 432a and 432b change as shown in FIGS. 12A to 12D. The capacitance detected for the detection electrodes 432a, which have no capacitive coupling with the detection electrode facing portions 422 at the time of activation, increases across an upper threshold 1215, because the detection electrodes face the detection electrode facing portions 422 and are capacitively coupled with them in accordance with rotational movement of the movable portion 400. The capacitance detected for the detection electrodes 432b, that was large at the time of activation due to capacitive coupling with the detection electrode facing portions 422, decreases across a lower threshold 1216 because the capacitive coupling is canceled.

Figure 11C:
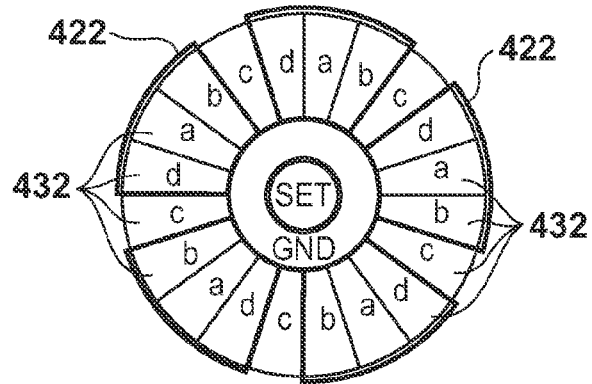
Figure 11D:
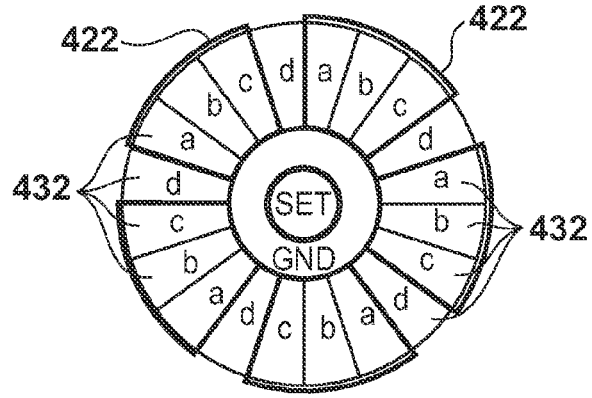
Figure 12A:
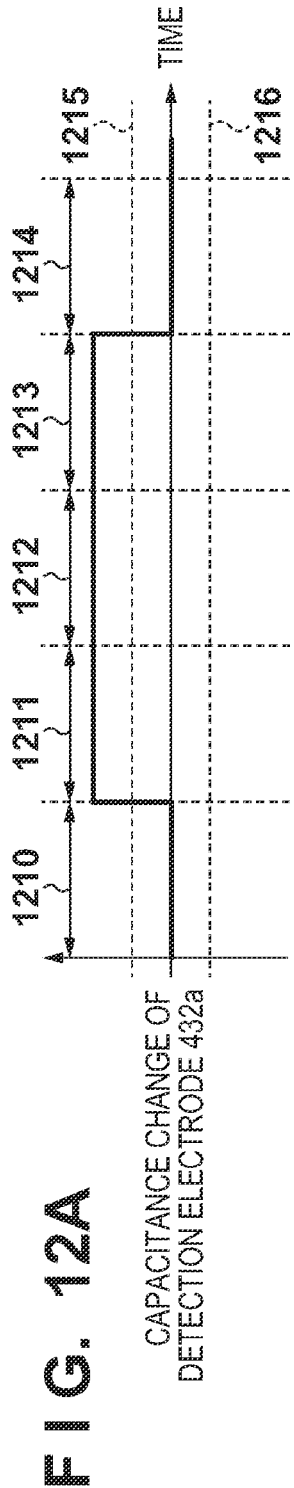
FIGS. 12A, 12B, 12C, and 12D are timing charts showing the change amounts of the capacitances of the detection electrodes 432 from the time of activation, which change in accordance with the rotation operation of the operation member according to the modification of the present invention.
Figure 12B:
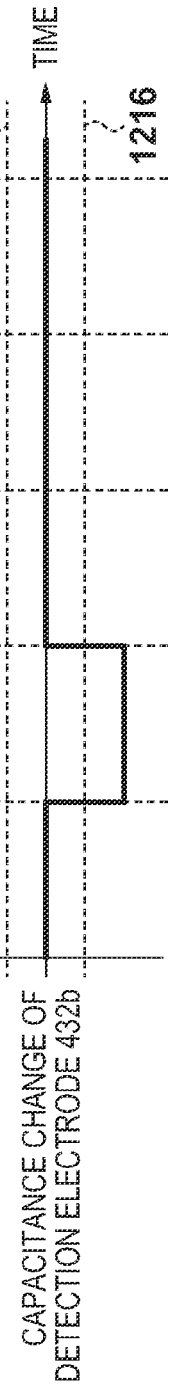
Figure 12C:
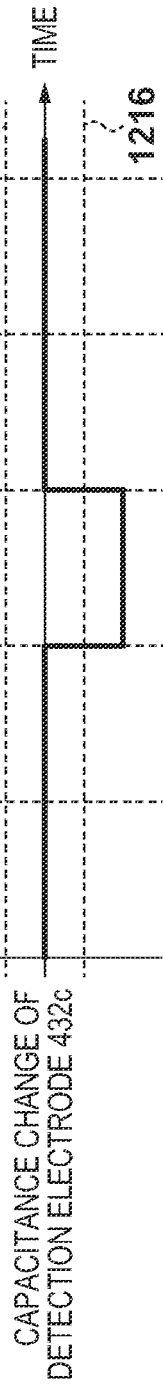
Figure 12D:
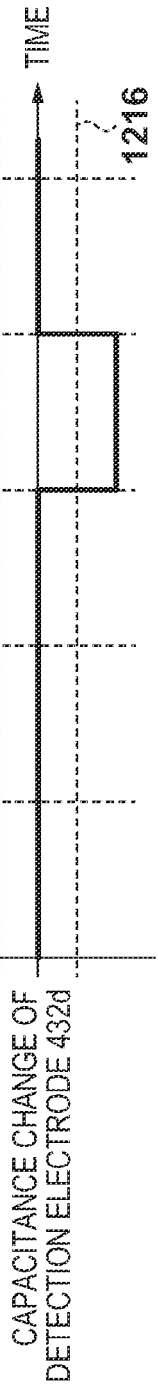

Similarly, when the relationship between the electrical conductor 420 and the substrate 430 transits from the state in FIG. 11B to the state in FIG. 11C, the capacitances of the detection electrodes 432b and 432c change from the values in the period 1211 to the values in the period 1212. When the relationship between the electrical conductor 420 and the substrate 430 transits from the state in FIG. 11C to the state in FIG. 11D, the capacitances of the detection electrodes 432c and 432d change from the values in the period 1212 to the values in the period 1213. When the relationship between the electrical conductor 420 and the substrate 430 transits from the state in FIG. 11D to the state in FIG. 11A, the capacitances of the detection electrodes 432d and 432a change from the values in the period 1213 to the values in the period 1214 and return to the same capacitances as in the period 1210.

As in the first embodiment, to judge whether the change amount of the capacitance of each detection electrode 432 from the time of activation has been generated by rotational movement of the electrical conductor 420 according to the user's rotation operation of the movable portion 400, the upper threshold 1215 (second threshold) and the lower threshold 1216 (first threshold) are provided.

According to the example shown in FIGS. 12A to 12D, in the period 1211, the capacitance of the detection electrodes 432a has a value equal to or larger than the upper threshold set with respect to the reference value, whereas the capacitance of the detection electrodes 432b has a value equal to or smaller than the lower threshold set with respect to the reference value. Similarly, in the period 1212, the capacitance of the detection electrodes 432a has a value equal to or larger than the upper threshold (equal to or larger than the second threshold), whereas the capacitance of the detection electrodes 432c has a value equal to or smaller than the lower threshold (equal to or smaller than the first threshold). In the period 1213, the capacitance of the detection electrodes 432a has a value equal to or larger than the upper threshold, whereas the capacitance of the detection electrodes 432d has a value equal to or smaller than the lower threshold.

At this time, as in the first embodiment, the detection electrodes having a capacitance equal to or larger than the upper threshold and the detection electrodes having a capacitance equal to or smaller than the lower threshold in each period can time-serially be represented by logic values of 1 and 0 (1 when the condition is satisfied) as shown in FIGS. 13A and 13B. When the logic value of the detection state for the upper threshold is subtracted from the logic value of the detection state for the lower threshold, a result as shown in FIG. 13C is obtained. That is, in FIG. 13C, a detection electrode whose capacitance has changed to be equal to or smaller than the lower threshold is represented by "1", and a detection electrode whose capacitance has changed to be equal to or larger than the upper threshold is represented by "−1" in each period.

In addition, when the corresponding values in the immediately preceding period are subtracted from the values representing the state in which the capacitance has changed to be equal to or smaller than the lower threshold and the state in which the capacitance has changed to be equal to or larger than the upper threshold in each period, information representing whether the capacitance has increased/decreased between the states can be obtained, as shown in FIG. 13D. In FIG. 13D, a detection electrode whose capacitance has increased across the upper threshold or the lower threshold between the states due to state transition is represented by "−1", and a detection electrode whose capacitance has decreased across the upper threshold or the lower threshold is represented by "1". In this modification, the presence/absence of rotation of the movable portion 400 is judged by detecting the detection electrodes 432 having no capacitive coupling, contrary to the above-described embodiment. Hence, the rotation direction of the movable portion 400 can be determined as the direction from the detection electrode represented by "−1" (detection electrode whose capacitance has increased) to the detection electrode represented by "1" (detection electrode whose capacitance has decreased) in FIG. 13D. For example, the CPU 101 can determine, based on the increase/decrease in the capacitance from the period 1210 to the period 1211, that the movable portion 400 has moved in the direction from the detection electrode 432a to the detection electrode 432b.

Figure 13E:
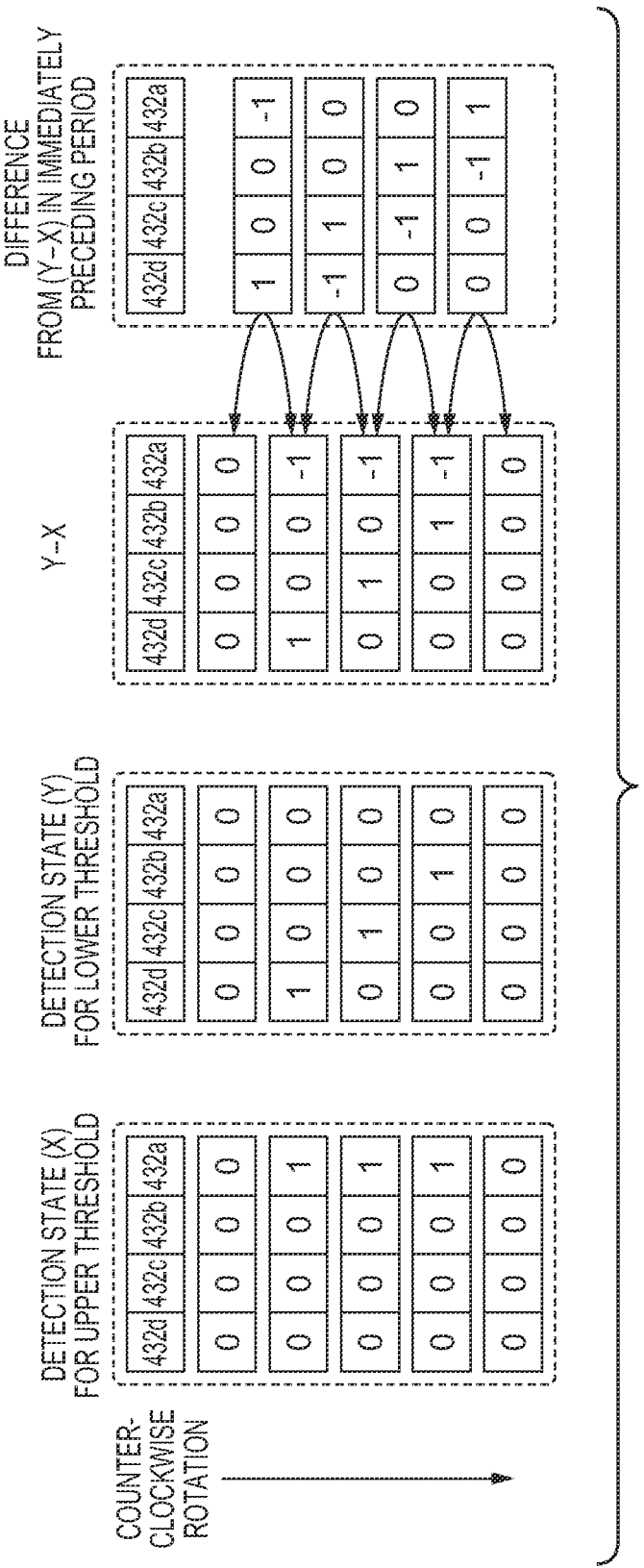

Similarly, when the rotation operation of the movable portion 400 is done in the reverse direction, information representing whether the capacitance of a detection electrode has increased/decreased between the states can be obtained, as shown in FIG. 13E. This allows the CPU 101 to determine the rotation direction.

Second Embodiment

The first embodiment and the modification have been described assuming that the GND facing portion 421 and the GND pattern 431, and the detection electrode facing portions 422 and the detection electrodes 432 (that the detection electrode facing portions 422 overlap) are capacitively coupled with each other in the electrical conductor 420 and the substrate 430 of the rotation operation unit 201. In the second embodiment, a method of improving the detection sensitivity for rotational movement of a movable portion 400 more than the first embodiment and the modification will be described.

As described above, the capacitance between two electrical conductors that are capacitively coupled with each other changes in proportion to the area of the electrical conductors facing each other. That is, to improve the detection sensitivity for rotational movement of the movable portion 400, the area of each of a plurality of detection electrodes 432 serving as sensor electrodes 112 and the area of a detection electrode facing portion 422 facing the detection electrode are preferably increased. However, since the width of one detection electrode 432 in the circumferential direction is decided by the rotation resolution of the movable portion 400 of a rotation operation unit 201, the length in the radial direction needs to be changed to increase the areas of the detection electrodes 432 and the detection electrode facing portions 422. That is, it is necessary to reduce the areas of a GND facing portion 421 and a GND pattern 431.

For this purpose, in this embodiment, coupling portions 1400a and 1400b as shown in FIGS. 14A and 14B are provided on the GND facing portion 421 of an electrical conductor 420 so as to be electrically coupled with the GND pattern 431, thereby setting the entire electrical conductor 420 at the ground potential. In this embodiment, the GND pattern 431 of a substrate 430 is a resist opening, and the coupling portions 1400 are in contact with the GND pattern 431. Note that in this embodiment, the description will be made assuming that one each coupling portion 1400 has one end fixed to the GND facing portion 421, and the electrical conductor 420 can rotationally move while keeping the other end of each coupling portion 1400 in contact with the GND pattern 431. However, each coupling portion 1400 may have one end fixed to the GND pattern 431, and the electrical conductor 420 may be able to rotationally move while being in contact with the other end of each coupling portion 1400. That is, the coupling portions 1400 need only electrically couple the electrical conductor 420 and the GND pattern 431 with each other such that the electrical conductor 420 is set at the ground potential.

Providing the coupling portions 1400 allows to set the electrical conductor 420 at the ground potential. For this reason, the area of the GND pattern 431 need at least allow to provide the coupling portions 1400 to electrically couple the GND pattern 431 with the electrical conductor 420. That is, a capacitance sensor IC 111 can detect the capacitance to the ground when the detection electrodes 432 are capacitively coupled with at least the electrical conductor 420 which has the ground potential. Hence, in this embodiment, the area of the GND pattern 431 is reduced, and the areas of the detection electrodes 432 are increased in the radial direction. Similarly, since the electrical conductor 420 is electrically coupled with the GND pattern 431 by the coupling portions 1400, it is possible to reduce the area of the GND facing portion 421 and increase the areas of the detection electrode facing portions 422 in the radial direction.

This allows the rotation operation unit 201 of this embodiment to increase the area of the detection electrode facing portion 422 facing one detection electrode 432 and improve the detection sensitivity for rotational movement of the movable portion 400.

In the above-described first and second embodiment and modification, the rotation operation unit 201, having a rotary encoder for performing capacitance type rotational movement detection, has been exemplified. However, the present invention is also applicable to detect movement of an operation member such as a slider 202 that inputs translation.

<Arrangement of Slider 202>

Figure 15A:
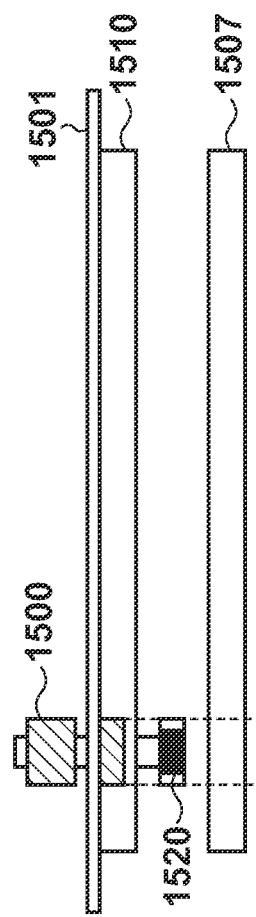
FIGS. 15A, 15B, and 15C are views showing the arrangement of a slider 202 that performs capacitance type movement detection.
Figure 15B:
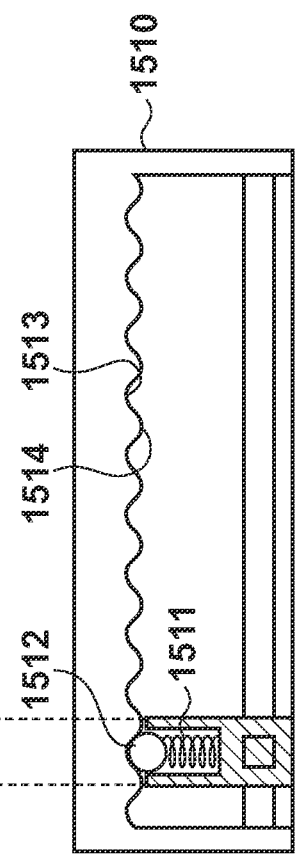
Figure 15C:
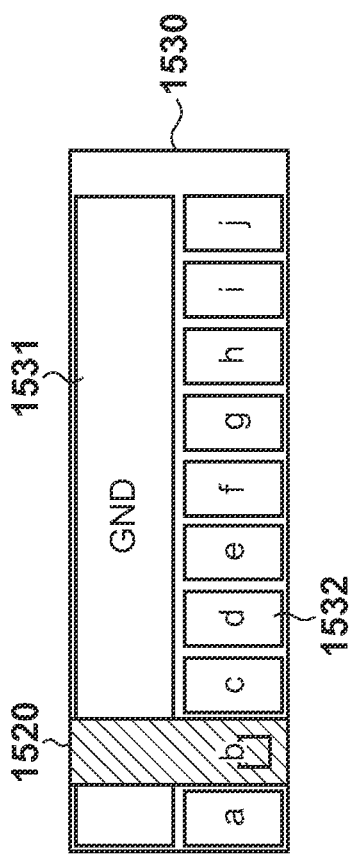

When detecting movement of the slider 202 by capacitance type detection, the slider is configured as shown in, for example, FIGS. 15A to 15C so as to enable movement detection of the operation member by capacitance type detection, like the rotation operation unit 201.

As shown in the sectional view of FIG. 15A, the slider 202 includes a movable portion 1500, a guide frame 1510, an electrical conductor 1520, and a substrate 1530 as members corresponding to the movable portion 400, the guide ring 410, the electrical conductor 420, and the substrate 430 of the rotation operation unit 201. In the slider 202, the movable portion 1500 is supported by a rail 1501 so as to move only in the movable direction (horizontal direction of FIG. 15A).

As shown in FIG. 15B, in the guide frame 1510, a ball 1512 attached to the movable portion 1500 via a spring 1511 is fitted in a concave portion 1513, as in the guide ring 410 of the rotation operation unit 201. The guide frame 1510 thus allows to move the movable portion 1500 for each detection electrode 1532.

The substrate 1530 includes the plurality of detection electrodes 1532 having the same size and sequentially provided in the movable direction of the movable portion 1500, and a GND pattern 1531 extending in the movable direction, as shown in FIG. 15C. The electrical conductor 1520 that moves in accordance with movement of the movable portion 1500 faces the substrate 1530 at a predetermined spacing. When the ball 1512 engages with a concave portion of the guide frame 1510, the electrical conductor 1520, the detection electrode 1532, and the GND pattern 1531 are capacitively coupled with each other. Although not illustrated, each detection electrode 1532 is connected to the capacitance sensor IC 111 so that the capacitance sensor IC 111 detects the capacitance.

As described above, the moving direction detection method of the present invention is applicable to any arrangement capable of detecting a capacitance change using at least three detection electrodes each capacitively coupled with an electrical conductor that faces the detection electrode and moves in accordance with movement of the operation member.

Note that control of the CPU 101 can be done either by one piece of hardware or divisionally by a plurality of pieces of hardware to control the entire device. In each of the above-described embodiments, processing described to be executed divisionally by the CPU 101 and the capacitance sensor IC 111 may be done by one piece of hardware. The present invention has been described above in detail based on the preferred embodiments. However, the present invention is not limited to these specific embodiments and can incorporate various forms without departing from the scope of the present invention. The above-described embodiments are merely examples of the present invention and can also be combined as needed.

In the above embodiments, an example in which the present invention is applied to a digital camera has been described. However, the present invention is not limited to this example and is applicable to any device. That is, the present invention is applicable to a personal computer, a PDA, a cellular phone terminal, a portable image viewer, a printer apparatus having a display, a digital photo frame, a music player, a game machine, an electronic book reader, and so on.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-167439, filed Jul. 29, 2011, which is hereby incorporated by reference herein in its entirety.

What is claimed is:

1. An input detection device comprising:
a movable portion configured to be rotatable by user's operation;
a first electrical conductor configured to rotate together with said movable portion and to change a position in accordance with the rotation of said movable portion;
a substrate in which at least three detection electrodes capable of independently detecting a capacitance are sequentially arranged in the rotatable direction of said movable portion in order to detect the position of said first electrical conductor, where said at least three detection electrodes are arranged facing with said movable portion, such that, in a case where at least one of said at least three detection electrodes faces said first electrical conductor, another detection electrode does not face said first electrical conductor;
a detection unit configured to detect the capacitance for each of said at least three detection electrodes; and
a determination unit configured to, when the position of said first electrical conductor has changed in accordance with the rotation of said movable portion, determine, based on the capacitance of each of said at least three detection electrodes detected by said detection unit after the change, that said movable portion has moved in a direction from a first detection electrode judged to have decreased the capacitance smaller than a first reference value for said first detection electrode and smaller than a second reference value for the second detection electrode to a second detection electrode judged to have increased the capacitance greater than the second reference value for said second detection electrode and greater than the first reference value.

2. The device according to claim 1, wherein said first electrical conductor is arranged to face one of said at least three detection electrodes.

3. The device according to claim 1, further comprising a storage unit configured to store the capacitance detected for each of said at least three detection electrodes at time of activation of the input detection device as the reference value of each of said detection electrodes,
wherein, when the position of said first electrical conductor has changed for the first time after the activation, said determination unit determines that said first electrical conductor has moved in the direction from a first detection electrode judged to have made the capacitance smaller than the first reference value stored in said storage unit to a second detection electrode judged to have made the capacitance larger than the second reference value.

4. The device according to claim 1, further comprising a setting unit configured to define the capacitance detected for each of said at least three detection electrodes at time of activation of the input detection device as the reference value of each of said detection electrodes and set, with respect to the reference value of each detection electrode, a first threshold to be used to judge that the capacitance is smaller than the reference value and a second threshold to be used to judge that the capacitance is larger than the reference value,
wherein, when the position of said first electrical conductor has changed for the first time after the activation, said determination unit determines that said first electrical conductor has moved in the direction from a first detection electrode judged to have a capacitance smaller than the first threshold set by said setting unit to a second detection electrode judged to have a capacitance larger than the second threshold set by said setting unit.

5. The device according to claim 1, wherein:
when the position of said first electrical conductor has changed for the first time after the activation of the input detection device, said determination unit determines that said first electrical conductor has moved in the direction from a first detection electrode judged to have decreased the capacitance to a second detection electrode judged to have increased the capacitance, and
when the position of said first electrical conductor has changed next, determines, independently of whether the capacitance has decreased, that said first electrical conductor has moved in a direction from a detection electrode judged to have increased the capacitance before movement to a detection electrode judged to have increased the capacitance after movement.

6. The device according to claim 1, further comprising a second electrical conductor having a ground potential,
wherein, when said first electrical conductor faces at least one detection electrode except the another detection electrode out of said at least three detection electrodes, said first electrical conductor and the detection electrode facing the first electrical conductor, and said first electrical conductor and said second electrical conductor are capacitively coupled with each other.

7. The device according to claim 6, further comprising a coupling portion configured to electrically couple said first electrical conductor with said second electrical conductor,
wherein, said first electrical conductor and said second electrical conductor have the ground potential.

8. The device according to claim 1, further comprising a clickable mechanism configured to change the position of said first electrical conductor using one of said at least three detection electrodes as a moving unit.

9. The device according to claim 1, wherein when said at least three detection electrodes are cyclically arranged, said determination unit determines that said first electrical conductor has moved in the direction from the first detection electrode to the second detection electrode across a boundary where the first detection electrode and the second detection electrode are adjacent to each other.

10. The device according to claim 1, wherein said movable portion is a rotation operation member.

11. The device according to claim 1, wherein the input detection device is an image capturing device having an image capturing unit.

12. An input detection device comprising:
a movable portion configured to be rotatable by user's operation;
a first electrical conductor configured to rotate together with said movable portion and to change a position in accordance with the rotation of said movable portion;
a substrate in which at least three detection electrodes capable of independently detecting a capacitance are sequentially arranged in the movable direction of said movable portion in order to detect the position of said first electrical conductor, where said at least three detection electrodes are arranged facing with said movable portion, such that, in a case where at least one of said at least three detection electrodes faces said first electrical conductor, other detection electrodes do not face said first electrical conductor;
a detection unit configured to detect the capacitance for each of said at least three detection electrodes; and
a determination unit configured to, when the position of said first electrical conductor has changed in accordance with the rotation of said movable portion, determine, based on the capacitance of each of said at least three detection electrodes detected by said detection unit after the change, that said movable portion has moved in a direction from a first detection electrode judged to have increased the capacitance greater than a first reference value for said first detection electrode and greater than a second reference value for said second detection electrode to a second detection electrode judged to have decreased the capacitance smaller than the second reference value for said second detection electrode and smaller than the first reference value.

13. The device according to claim 12, wherein said first electrical conductor is arranged to face a detection electrode except one of said at least three detection electrodes.

14. The device according to claim 12, further comprising a storage unit configured to store the capacitance detected for each of said at least three detection electrodes at time of activation of the input detection device as the reference value of each of said detection electrodes,
wherein, when the position of said first electrical conductor has changed for the first time after the activation, said determination unit determines that said first electrical conductor has moved in the direction from a first detection electrode judged to have made the capacitance larger than the first reference value stored in said storage unit to a second detection electrode judged to have made the capacitance smaller than the second reference value.

15. The device according to claim 12, further comprising a setting unit configured to define the capacitance detected for each of said at least three detection electrodes at time of activation of the input detection device as the reference value of each of said detection electrodes and set, with respect to the reference value of each detection electrode, a first threshold to be used to judge that the capacitance is smaller than the reference value and a second threshold to be used to judge that the capacitance is larger than the reference value,
wherein, when the position of said first electrical conductor has changed for the first time after the activation, said determination unit determines that said first electrical conductor has moved in the direction from a first detection electrode judged to have a capacitance larger than the second threshold set by said setting unit to a second detection electrode judged to have a capacitance smaller than the first threshold set by said setting unit.

16. The device according to claim 12, further comprising a second electrical conductor having a ground potential,
wherein, when said first electrical conductor faces at least one detection electrode except the other detection electrodes out of said at least three detection electrodes, said first electrical conductor and the detection electrode facing the first electrical conductor, and said first electrical conductor and said second electrical conductor are capacitively coupled with each other.

17. The device according to claim 16, further comprising a coupling portion configured to electrically couple said first electrical conductor with said second electrical conductor,
wherein said first electrical conductor and said second electrical conductor have the ground potential.

18. The device according to claim 12, further comprising a clickable mechanism configured to change the position of said first electrical conductor using one of said at least three detection electrodes as a moving unit.

19. The device according to claim 12, wherein when said at least three detection electrodes are cyclically arranged, said determination unit determines that said first electrical conductor has moved in the direction from the first detection electrode to the second detection electrode across a boundary where the first detection electrode and the second detection electrode are adjacent to each other.

20. The device according to claim 12, wherein said movable portion is a rotation operation member.

21. The device according to claim 12, wherein the movable portion is a slider operation member.

22. A control method of an input detection device including:
a movable portion configured to be rotatable by user's operation;
a first electrical conductor configured to rotate together with said movable portion and to change a position in accordance with the rotation of said movable portion;
a substrate in which at least three detection electrodes capable of independently detecting a capacitance are sequentially arranged in the movable direction of said movable portion in order to detect the position of said first electrical conductor, where said at least three detection electrodes are arranged facing with said movable portion, such that, in a case where at least one of said at least three detection electrodes faces the first electrical conductor, another detection electrode does not face the first electrical conductor; and
a detection unit configured to detect the capacitance for each of said at least three detection electrodes, the method comprising:
when the position of said first electrical conductor has changed in accordance with the rotation of said movable portion, determining, based on the capacitance of each of said at least three detection electrodes detected by said detection unit after the change, that said movable portion has moved in a direction from a first detection electrode judged to have decreased the capacitance smaller than a first reference value for said first detection electrode and smaller than a second reference value for said second detection electrode to a second detection electrode judged to have increased the capacitance greater than the second reference value for said second detection electrode and greater than the first reference value.

23. A control method of an input detection device including:
a movable portion configured to be rotatable by user's operation;

a first electrical conductor configured to rotate together with said movable portion and to change a position in accordance with the rotation of said movable portion;

a substrate in which at least three detection electrodes capable of independently detecting a capacitance are sequentially arranged in the movable direction of said movable portion in order to detect the position of said first electrical conductor, where said at least three detection electrodes are arranged facing with said movable portion, such that, in a case where at least one of said at least three detection electrodes faces said first electrical conductor, other detection electrodes do not face the first electrical conductor; and a detection unit configured to detect the capacitance for each of said at least three detection electrodes, the method comprising:

when the position of said first electrical conductor has changed in accordance with the rotation of said movable portion, determining, based on the capacitance of each of said at least three detection electrodes detected by said detection unit after the change, that said movable portion has moved in a direction from a first detection electrode judged to have increased the capacitance greater than a first reference value for said first detection electrode and greater than a second reference value for said second detection electrode to a second detection electrode judged to have decreased the capacitance smaller than the second reference value for said second detection electrode and smaller than the first reference value.

24. A computer-readable non-transitory storage medium storing a program that causes a computer to function as each unit of an input detection device of claim 1.

25. A computer-readable non-transitory storage medium storing a program that causes a computer to function as each unit of an input detection device of claim 12.

26. The input detection device in accordance with claim 1, wherein:

when the position of said first electrical conductor is moved from the first detection electrode to the second detection electrode, the capacitance of the first detection electrode decreases from the first reference value to smaller than the first reference value, and the capacitance of the second detection electrode increases from the second reference value to greater than the second reference value, and when the position of the first electrical conductor is moved from the second detection electrode to the first detection electrode, the capacitance of the first detection electrode increases from a value smaller than the first reference value to the first reference value and the capacitance of the second detection electrode decreases from a value greater than the second reference value to the second reference value.

27. The input detection device in accordance with claim 12, wherein:

when the position of said first electrical conductor is moved from the first detection electrode to the second detection electrode, the capacitance of the first detection electrode increases from the first reference value to greater than the first reference value, and the capacitance of the second detection electrode decreases from the second reference value to smaller than the second reference value, and when the position of the first electrical conductor is moved from the second detection electrode to the first detection electrode, the capacitance of the first detection electrode decreases from a value greater than the first reference value to the first reference value and the capacitance of the second detection electrode increases from a value smaller than the second reference value to the second reference value.

\* \* \* \* \*